United States Patent
Hara et al.

(10) Patent No.: US 8,507,580 B2
(45) Date of Patent: *Aug. 13, 2013

(54) ANTIFOULING COMPOSITION, PROCESS FOR ITS PRODUCTION AND ARTICLE TREATED THEREWITH

(75) Inventors: Hiroyuki Hara, Chiyoda-ku (JP); Shuichiro Sugimoto, Chiyoda-ku (JP); Takao Hirono, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/913,900

(22) Filed: Oct. 28, 2010

(65) Prior Publication Data

US 2011/0039975 A1 Feb. 17, 2011

Related U.S. Application Data

(63) Continuation of application No. PCT/JP2009/059724, filed on May 27, 2009.

(30) Foreign Application Priority Data

May 28, 2008 (JP) ................................ 2008-139770

(51) Int. Cl.
C08L 27/12 (2006.01)
C08K 5/05 (2006.01)
(52) U.S. Cl.
USPC ............................ 523/122; 523/177; 524/379
(58) Field of Classification Search
USPC ................... 523/122, 177; 524/379
See application file for complete search history.

(56) References Cited

U.S. PATENT DOCUMENTS

| 2003/0153664 A1* | 8/2003 | Sugimoto et al. ............. 524/386 |
| 2007/0015867 A1* | 1/2007 | Maekawa et al. ............. 524/544 |
| 2010/0069565 A1 | 3/2010 | Hara et al. |

FOREIGN PATENT DOCUMENTS

| JP | 2777040 | 5/1998 |
| JP | 2000-169735 | 6/2000 |
| JP | 2001-081144 | 3/2001 |
| JP | 2001-098257 | 4/2001 |
| JP | 3320491 | 6/2002 |
| JP | 3820694 | 6/2006 |
| WO | 2005/090423 | 9/2005 |

OTHER PUBLICATIONS

International Search Report issued Sep. 8, 2009 in PCT/JP09/059724 filed May 27, 2009.

* cited by examiner

*Primary Examiner* — Kriellion Sanders
(74) *Attorney, Agent, or Firm* — Oblon, Spivak, McClelland, Maier & Neustadt, L.L.P.

(57) ABSTRACT

To provide a process for efficiently producing a fluorine type antifouling composition employing a short chain $R^f$ group, which can be made in the form of an aqueous dispersion containing substantially no volatile organic solvent and has a good soil release property (SR property).

A process for producing an antifouling composition, which comprises a step of subjecting monomer components (Z) comprising from 30 to 80 mass % of a monomer (a) having a polyfluoroalkyl group in which the number of carbon atoms to which fluorine atoms are bonded is from 4 to 6, and from 20 to 70 mass % of a monomer (b) having no polyfluoroalkyl group and having a hydrophilic group, to solution polymerization in a volatile organic solvent having a boiling point of at most 100° C. in the presence of a surfactant (c) comprising an ethylene oxide adduct of 2,4,7,9-tetramethyl-5-decyne-4,7-diol to form a fluorocopolymer (A), and a step of volatilizing the volatile organic solvent after the solution polymerization and adding an aqueous medium to form an aqueous dispersion.

16 Claims, No Drawings

ANTIFOULING COMPOSITION, PROCESS FOR ITS PRODUCTION AND ARTICLE TREATED THEREWITH

TECHNICAL FIELD

The present invention relates to an antifouling composition, a process for its production and an article treated with the antifouling composition.

BACKGROUND ART

Heretofore, as treating agents for water/oil repellent treatment or antifouling treatment of clothing, various compositions have been provided depending upon the particular purposes. For work wears such as work clothes, linen such as rental sheets, etc., it has been common to employ a fluorine type SR (soil release) agent which has both water/oil repellency to prevent soiling and SR (soil release) property whereby any soil attached may readily be removed by cleaning or washing.

For example, there have been proposed a fluorine type antifouling agent containing, as an effective component, a copolymer of a (meth)acrylate containing a polyfluoroalkyl group, a (meth)acrylate containing a polyoxyalkylene chain and a (meth)acrylate containing a blocked isocyanate group (the following Patent Document 1), a fluorine type antifouling agent containing, as an effective component, a copolymer of a (meth)acrylate containing a polyfluoroalkyl group, a (meth)acrylate containing a polyoxyalkylene chain and a (meth)acrylate containing an acetoacetyl group (the following Patent Document 2), etc.

However, these fluorine type antifouling agents contain a relatively large amount of an organic solvent in order to obtain good dispersibility of the fluorocopolymer, whereby a load to the environment is substantial at the time of practical applications.

Under the circumstances, the following Patent Document 3 proposes a fluorocopolymer prepared by copolymerizing a monomer mixture comprising a (meth)acrylate having a $C_{4-12}$ polyfluoroalkyl group, a (meth)acrylate containing a polyoxyalkylene chain and a (meth)acrylate having an amino group having hydrogen atoms substituted by alkyl groups. It is disclosed that this copolymer has aqueous dispersibility, and it is possible to obtain an oil- and water-proof finishing agent made of an aqueous dispersion, by using such a copolymer.

Patent Document 1: Japanese Patent No. 3,320,491
Patent Document 2: Japanese Patent No. 3,820,694
Patent Document 3: Japanese Patent No. 2,777,040

DISCLOSURE OF THE INVENTION

Problem to be Solved by the Invention

However, the finishing agent disclosed in the above Patent Document 3 has a problem that its soil release property (SR property) is poor, although the aqueous dispersibility of the fluorocopolymer is obtainable. Further, in a process for producing a self-aqueous dispersible fluorocopolymer such as the finishing agent disclosed in the above Patent Document 3, it is common to employ after solution polymerization a step of adding water to the resulting polymer-containing solution and removing the solvent used for the polymerization by volatilization. In this process, bubbles formed particularly at the time of removing the solvent by volatilization are problematic in the production process.

Further, a polyfluoroalkyl group (hereinafter a polyfluoroalkyl group will be referred to as a $R^f$ group) to be used for a conventional fluorine type SR agent mainly has 8 or more carbon atoms. However, in recent years, EPA (United States Environmental Protection Agency) has pointed out that a perfluoroalkyl group (hereinafter a perfluoroalkyl group will be referred to as a $R^F$ group) having 8 or more carbon atoms is likely to be decomposed in the environment or in the living organism, whereby decomposition products are accumulated, that is, it imposes a heavy environmental burden. Accordingly, it has been recommended to employ a short chain $R^f$ group having at most 6 carbon atoms for a compound, and an antifouling composition having excellent antifouling performance even having a short $R^f$ group has been required.

The present invention has been made under such circumstances and has an object to provide an antifouling composition which is a fluorine type antifouling composition employing a short chain $R^f$ group and which can be made in the form of an aqueous dispersion containing substantially no volatile organic solvent and has a good soil release property (SR property), an article treated with such an antifouling composition, and a process capable of efficiently producing such an antifouling composition.

Means to Solve the Problem

In order to solve the above problem, the antifouling composition of the present invention comprises a 100 parts by mass of a fluorocopolymer (A) comprising from 30 to 80 mass % of polymerized units based on the following monomer (a) and from 20 to 70 mass % of polymerized units based on the following monomer (b), and from 3 to 30 parts by mass of a surfactant (c), wherein the surfactant (c) comprises at least one compound represented by the following formula (I), and the average value of (x1+x2) per one molecule in the surfactant (c) is at least 6;

monomer (a): a monomer having a polyfluoroalkyl group in which the number of carbon atoms to which fluorine atoms are bonded is from 4 to 6 (provided that the polyfluoroalkyl group may contain an etheric oxygen atom);

monomer (b): a monomer having no polyfluoroalkyl group and having at least one hydrophilic group selected from the group consisting of an alkylene oxide group, an amino group, a hydroxy group, an acrylamide group, a carboxy group, a phosphoric acid group and a sulfone group;

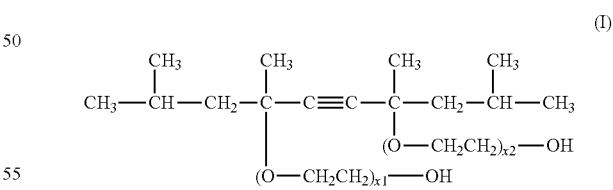

(I)

wherein each of x1 and x2 is an integer of at least 1, and (x1+x2) is at least 2 and at most 30.

The polymerized units based on the monomer (b) preferably contain polymerized units based on a compound presented by the following formula (1):

wherein $R^1$ is a hydrogen atom or a methyl group, $R^2$ is a hydrogen atom, a methyl group, an acryloyl group or a methacryloyl group, q1 is an integer of from 1 to 50, and $G^1$ is —COO(CH$_2$)$_{r1}$— or —COO(CH$_2$)$_{r1}$—NHCOO— (wherein r1 is an integer of from 0 to 4, and t1 is an integer of from 1 to 4).

The polymerized units based on the monomer (b) preferably contain polymerized units based on a compound represented by the following formula (2) or (3):

$$CH_2=CR^3\text{-M-Q-}NR^4R^5 \quad (2)$$

$$CH_2=CR^3\text{-M-Q-}N(O)R^4R^5 \quad (3)$$

wherein $R^3$ is a hydrogen atom or a methyl group, M is —COO— or —CONH—, Q is a $C_{2-4}$ alkylene group or a $C_{2-3}$ alkylene group having some of or all the hydrogen atoms substituted by hydroxy groups, and each of $R^4$ and $R^5$ which are independent of each other, is a benzyl group, a $C_{1-8}$ alkyl group or a $C_{2-3}$ alkyl group having some of hydrogen atoms substituted by hydroxy groups, provided that $R^4$, $R^5$ and the nitrogen atom may form a piperidino group or a pyrrolidinyl group, and $R^4$, $R^5$, the oxygen atom and the nitrogen atom may form a morpholino group.

The polymerized units based on the monomer (b) preferably contain polymerized units based on a compound represented by the following formula (4):

$$CH_2=CR^6\text{-}G^2\text{-}(C_2H_4O)_{q2}\text{-}(C_4H_8O)_{q3}\text{-}R^7 \quad (4)$$

wherein each of $R^6$ and $R^7$ which are independent of each other, is a hydrogen atom or a methyl group, q2 is an integer of 0 or from 1 to 50, q3 is an integer of from 1 to 50, $G^2$ is —COO(CH$_2$)$_{r2}$— or —COO(CH$_2$)$_{r2}$—NHCOO— (wherein r2 is an integer of from 0 to 4, and t2 is an integer of from 1 to 4).

The fluorocopolymer (A) preferably further has polymerized units based on the following monomer (d):

monomer (d): a monomer other than the monomer (b), having no polyfluoroalkyl group, and having at least one functional group selected from the group consisting of an isocyanate group, a blocked isocyanate group, an alkoxysilyl group, an epoxy group, a N-methylol group and a N-alkoxymethyl group.

The present invention further provides an article treated with the antifouling composition of the present invention.

The process for producing an antifouling composition of the present invention comprises a step of subjecting monomer components (Z) comprising from 30 to 80 mass % of the above monomer (a) and from 20 to 70 mass % of the above monomer (b) to solution polymerization in an organic solvent containing a volatile organic solvent having a boiling point of at most 100° C. in the presence of a surfactant (c) to form a fluorocopolymer (A), and a step of volatilizing the volatile organic solvent after the solution polymerization and adding an aqueous medium to form an aqueous dispersion, wherein the surfactant (c) comprises at least one compound represented by the above formula (I), and the average value of (x1+x2) per one molecule in the surfactant (c) is at least 6.

The monomer (b) preferably contains a compound represented by the above formula (1).

The monomer (b) preferably contains a compound represented by the above formula (2) or (3).

The monomer (b) preferably contains a compound represented by the above formula (4).

The monomer components (Z) preferably further contain from 0.5 to 5 mass % of the above monomer (d).

Effects of the Invention

According to the present invention, it is possible to obtain a fluorine type antifouling composition employing a short chain $R^f$ group, which can be made in the form of an aqueous dispersion containing substantially no volatile organic solvent and has a good soil release property (SR property).

The article of the present invention is treated with an antifouling composition imposing a light environmental burden, and has an excellent surface antifouling property.

According to the process for producing an antifouling composition of the present invention, it is possible to produce an antifouling composition which has a good soil release property (SR property) even though the $R^f$ group in the compound is a short chain, and which can be made in the form of an aqueous dispersion containing substantially no volatile organic solvent. Further, formation of bubbles at the time of removing the organic solvent by volatilization can be suppressed, thus improving the production efficiency.

BEST MODE FOR CARRYING OUT THE INVENTION

In this specification, a compound represented by the formula (1) will be referred to as a compound (1). The same applies to compounds represented by other formulae. Further, in this specification, a group represented by the formula (2) will be referred to as a group (2). The same applies to groups represented by other formulae.

In this specification, a (meth)acrylate means an acrylate or a methacrylate.

In this specification, a monomer means a compound having a polymerizable unsaturated group.

In this specification, an $R^f$ group is a group (polyfluoroalkyl group) having some of or all the hydrogen atoms in an alkyl group substituted by fluorine atoms, and may contain an etheric oxygen atom.

$R^F$ group is a group (perfluoroalkyl group) having all the hydrogen atoms in an alkyl group substituted by fluorine atoms, and may contain an etheric oxygen atom.

<Antifouling Composition>

The antifouling composition of the present invention comprises a fluorocopolymer (A) (hereinafter sometimes referred to simply as a polymer (A)) and a surfactant (c) as essential components.

<Fluorocopolymer (A)>

The fluorocopolymer (A) is a fluorocopolymer comprising polymerized units based on a monomer (a) and polymerized units based on a monomer (b).

The monomer (a) is a monomer having a $R^f$ group in which the number of carbon atoms to which fluorine atoms are bonded is from 4 to 6.

The monomer (a) may, for example, be a compound (5):

$$(Z-Y)_nX \quad (5)$$

wherein Z is a $C_{4-6}$ $R^f$ group or a group (6):

$$C_iF_{2i+1}O(CFX^1CF_2O)_jCFX^2— \quad (6)$$

wherein i is an integer of from 1 to 6, j is an integer of from 0 to 10, and each of $X^1$ and $X^2$ which are independent of each other, is a fluorine atom or a trifluoromethyl group.

The $R^f$ group is preferably a $R^F$ group. The $R^f$ group may be linear or branched, and is preferably linear.

Z may, for example, be the following groups:

$F(CF_2)_4—$, $F(CF_2)_6—$, $F(CF_2)_6—$, $(CF_3)_2CF(CF_2)_2—$, $C_kF_{2k+1}O[CF(CF_3)CF_2O]_h—CF(CF_3)—$, etc.

wherein k is an integer of from 1 to 6, and h is an integer of from 0 to 10.

Y is a bivalent organic group or a single bond.

The bivalent organic group is preferably an alkylene group. The alkylene group may be linear or branched. The alkylene group may have —O—, —NH—, —CO—, —SO$_2$—, —S—, —CD$^1$=CD$^2$- (wherein each of D$^1$ and D$^2$ which are independent of each other, is a hydrogen atom or a methyl group), etc.

Y may, for example, be the following groups:

—CH$_2$—,

—CH$_2$CH$_2$—

—(CH$_2$)$_3$—

—CH$_2$CH$_2$CH(CH$_3$)—,

CH=CH—CH$_2$—, etc.

n is 1 or 2.

X is any one of groups (7-1) to (7-5) in a case where n is 1, and is any one of groups (8-1) to (8-4) in a case where n is 2.

—CR=CH$_2$ (7-1),

—COOCR=CH$_2$ (7-2),

—OCOCR=CH$_2$ (7-3),

—OCH$_2$-φ-CR=CH$_2$ (7-4),

—OCH=CH$_2$ (7-5).

wherein R is a hydrogen atom, a methyl group or a halogen atom, and φ is a phenylene group;

—CH[—(CH$_2$)$_m$CR=CH$_2$]— (8-1),

—CH[—(CH$_2$)$_m$COOCR=CH$_2$]— (8-2),

—CH[—(CH$_2$)$_m$OCOCR=CH$_2$]— (8-3),

—OCOCH=CHCOO— (8-4).

wherein R is a hydrogen atom, a methyl group or a halogen atom, and m is an integer of from 0 to 4.

The compound (5) is preferably a (meth)acrylate having a C$_{4-6}$ R$^F$ group in view of polymerizability with other monomer, flexibility of a coating film of the polymer, adhesion of the polymer to an article, the solubility in a solvent, easiness of solution polymerization, etc.

The compound (5) is preferably a compound wherein Z is a C$_{4-6}$ R$^F$ group, Y is a C$_{1-4}$ alkylene group, n is 1, and X is the group (7-3).

Monomer (b)

The monomer (b) is a monomer having no polyfluoroalkyl group and having at least one group selected from the group consisting of an alkylene oxide group (—R'O—; R' is an alkylene group), an amino group, a hydroxy group, an acrylamide group (CH$^2$=CHCONH—), a carboxy group, a phosphoric acid group (—PO$_3$$^{2-}$) and a sulfone group (—SO$_2$(OH)). The amino group may have a hydrogen atom substituted. All of these groups are hydrophilic groups. A group which may be present as a salt may form a salt.

The monomer (b) can impart self-aqueous dispersibility and antifouling property (soil release property by washing with water) to the fluorocopolymer (A). The monomer (b) is more preferably a (meth)acrylate having the above hydrophilic group.

Among the above hydrophilic groups, preferred is an alkylene oxide group, a hydroxy group, a carboxy group or an amino group, and particularly preferred is an alkylene oxide group or an amino group.

Monomer (b1)

The monomer (b) preferably contains a monomer (b1) having no polyfluoroalkyl group and having an alkylene oxide group, the alkylene oxide group being an ethylene oxide group.

The monomer (b1) is preferably a compound (1):

$$CH_2=CR^1-G^1-(C_2H_4O)_{q1}-R^2 \qquad (1)$$

In the formula, R$^1$ is a hydrogen atom or a methyl group. R$^2$ is a hydrogen atom, a methyl group, an acryloyl group or a methacryloyl group, preferably a hydrogen atom, a methyl group or a methacryloyl group. q1 is an integer of from 1 to 50, preferably from 1 to 20. G$^1$ is —COO(CH$_2$)$_{r1}$— or —COO(CH$_2$)$_{r1}$—NHCOO— (wherein r1 is an integer of from 0 to 4, and t1 is an integer of from 1 to 4) and is preferably —COO(CH$_2$)$_{r1}$— (wherein r1 is an integer of from 0 to 4).

Hereinafter an ethylene oxide group (—C$_2$H$_4$O—) will sometimes be referred to as EO.

The compound (1) is preferably polyethylene oxide monoacrylate (CH$_2$=CHCOO(EO)$_{q1}$H), polyethylene oxide monomethacrylate (CH$_2$=C(CH$_3$)COO(EO)$_{q1}$H), methoxypolyethylene oxide monoacrylate (CH$_2$=CHCOO(EO)$_{q1}$CH$_3$), methoxypolyethylene oxide monomethacrylate (CH$_2$=C(CH$_3$)COO(EO)$_{q1}$CH$_3$), 2-hydroxyethyl acrylate (CH$_2$=CHCOOC$_2$H$_4$OH), 2-hydroxylethyl methacrylate (CH$_2$=C(CH$_3$)COOC$_2$H$_4$OH), polyethylene oxide diacrylate (CH$_2$=CHCOO(EO)$_{q1}$OCOCH=CH$_2$) or polyethylene oxide dimethacrylate (CH$_2$=C(CH$_3$)COO(EO)$_{q1}$OCOC(CH$_3$)=CH$_2$), more preferably methoxypolyethylene oxide methacrylate, 2-hydroxylethyl methacrylate or polyethylene oxide dimethacrylate, particularly preferably methoxypolyethylene oxide monomethacrylate.

Monomer (b2)

As the monomer (b), a monomer (b2) having no polyfluoroalkyl group and having an amino group (its hydrogen atom may be substituted) is also preferred. The monomer (b2) is preferably a compound (2) or a compound (3).

$$CH_2=CR^3-M-Q-NR^4R^5 \qquad (2)$$

$$CH_2=CR^3-M-Q-N(O)R^4R^5 \qquad (3)$$

In the formulae, R$^3$ is a hydrogen atom or a methyl group, M is —COO— (ester bond) or —CONH— (amide bond), Q is a C$_{2-4}$ alkylene group or a C$_{2-3}$ alkylene group having some of or all the hydrogen atoms substituted by hydroxy groups, and each of R$^4$ and R$^5$ which are independent of each other, is a benzyl group, a C$_{1-8}$ alkyl group or a C$_{2-3}$ alkyl group having some of hydrogen atoms substituted by hydroxy groups. R$^4$, R$^5$ and the nitrogen atom may form a piperidino group or a pyrrolidinyl group, and R$^4$, R$^5$, the oxygen atom and the nitrogen atom may form a morpholino group.

M is preferably —COO— (ester bond), Q is preferably a C$_{2-4}$ alkylene group, and each of R$^6$ and R$^7$ is preferably a C$_{2-4}$ alkyl group.

The compound (2) is preferably N,N-dimethylaminoethyl (meth)acrylate, N,N-diethylaminoethyl(meth)acrylate, N,N-dimethylaminopropyl(meth)acrylate, N,N-diethylaminopropyl(meth)acrylate, N,N-diisopropylaminoethyl(meth)acrylate or N,N-dimethylaminopropyl(meth)acrylamide.

The compound (3) is preferably N,N-dimethylamino oxide ethyl(meth)acrylate or N,N-diethylamino oxide ethyl(meth)acrylate.

Among the compounds (2) and (3), more preferred is N,N-dimethylaminoethyl methacrylate or N,N-diethylaminoethyl methacrylate.

Monomer (b3)

As the monomer (b), a monomer (b3) having a tetramethylene oxide group is also preferred.

The monomer (b3) preferably has an ethylene oxide group which is present in the same side chain as the tetramethylene oxide group. The monomer (b3) may have a hydrophilic group (except for an amino group) other than the ethylene oxide group and the tetramethylene oxide group which are present in the same side chain.

It is preferred that the alkylene oxide group in the monomer (b3) is the ethylene oxide group and the tetramethylene oxide group present in the same side chain.

In the monomer (b3), the copolymer chain of the ethylene oxide group (EO) and the tetramethylene oxide group ($—C_4H_8O—$, hereinafter sometimes referred to as TO) may be a random copolymer chain or a block copolymer chain.

The monomer (b3) is preferably a compound (4):

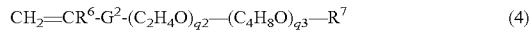

$$CH_2=CR^6\text{-}G^2\text{-}(C_2H_4O)_{q2}—(C_4H_8O)_{q3}—R^7 \quad (4)$$

In the formula, each of $R^6$ and $R^7$ which are independent of each other, is a hydrogen atom or a methyl group. $R^6$ is preferably a methyl group, and $R^7$ is preferably a hydrogen atom. q2 is 0 or an integer of from 1 to 50, preferably from 2 to 20. q3 is an integer of from 1 to 50, preferably from 2 to 20. $G^2$ is $—COO(CH_2)_{r2}—$ or $—COO(CH_2)_{t2}—NHCOO—$ (wherein r2 is an integer of from 0 to 4, and t2 is an integer of from 1 to 4), preferably $—COO(CH_2)_{r2}—$ (wherein r2 is an integer of from 0 to 4).

The compound (4) is preferably poly(ethylene oxide-tetramethylene oxide) monoacrylate ($CH_2=CHCOO\text{-}[(EO)_{q2}\text{-}(TO)_{q3}]—H$), poly(ethylene oxide-tetramethylene oxide) monomethacrylate ($CH_2=C(CH_3)COO\text{-}[(EO)_{q2}\text{-}(TO)_{q3}]—H$), methoxy poly(ethylene oxide-tetramethylene oxide) monoacrylate ($CH_2=CHCOO\text{-}[(EO)_{q2}\text{-}(TO)_{q3}]—CH_3$), methoxy poly(ethylene oxide-tetramethylene oxide) monomethacrylate ($CH_2=C(CH_3)COO\text{-}[(EO)_{q2}\text{-}(TO)_{q3}]—CH_3$), polytetramethylene oxide monoacrylate ($CH_2=CHCOO\text{-}(TO)_{q3}—H$), polytetramethylene oxide methacrylate ($CH_2=C(CH_3)COO\text{-}(TO)_{q3}—H$), methoxy polytetramethylene oxide monoacrylate ($CH_2=CHCOO\text{-}(TO)_{q3}—CH_3$) or methoxy polytetramethylene oxide monomethacrylate ($CH_2=C(CH_3)COO\text{-}(TO)_{q3}—CH_3$).

Among them, more preferred is poly(ethylene oxide-tetramethylene oxide) monomethacrylate.

For the fluorocopolymer (A), as the monomer (b), it is preferred to use the monomer (b1) and the monomer (b2) in combination, and it is more preferred to use the monomer (b1), the monomer (b2) and the monomer (b3) in combination.

Particularly, use of the monomer (b1) and the monomer (b2) in combination will contribute to the improvement of the dispersibility in an aqueous medium. When the dispersibility in an aqueous medium is good, the content of the volatile organic solvent in the antifouling composition can be suppressed, such being environmental friendly. Further, by the amino group in the monomer (b2), the fluorocopolymer (A) will have cationic properties, and uniform adhesion to a fibrous substrate the surface of which is weakly anionically charged will be improved.

Further, by containing the monomer (b3), the durability against washing is improved, and good oil repellency and antifouling property are obtained, as compared with a case where the monomer (b1) and the monomer (b2) are used in combination, or a case where the monomer (b1) and a monomer containing a polypropylene oxide chain in its side chain are used in combination, which is common in a conventional fluorinated antifouling agent. This is considered to be because the adhesion of the antifouling composition to a substrate is effectively improved by employing constituting units (b3) containing TO. The reason is considered to be such that a monomer containing EO and EO has a low Tg (glass transition point) as compared with a monomer containing only EO and a monomer containing only propylene oxide and resultingly, Tg of the fluorocopolymer (A) is decreased, thus further improving the film forming property. Further, the monomer (b3) containing EO and TO is considered not to inhibit the oil repellency since it is lyophobic in addition to be more hydrophobic than a monomer containing propylene oxide.

The fluorocopolymer (A) preferably further has from 0.5 to 5 mass % of polymerized units based on the following monomer (d):

Monomer (d): a monomer other than the monomer (b), having no polyfluoroalkyl group, and having at least one functional group selected from the group consisting of an isocyanate group, a blocked isocyanate group, an alkoxysilyl group, an epoxy group, a N-methylol group and a N-alkoxymethyl group.

By the fluorocopolymer (A) having constituting units based on the monomer (d), the durability against washing will be more improved.

Monomer (d)

As the monomer (d), a (meth)acrylate, an acrylamide, a vinyl ether or a vinyl ester is preferred.

As the monomer (d), the following compounds may be mentioned.

(1) Compound having an isocyanate group: 2-Isocyanateethyl(meth)acrylate, 3-isocyanatepropyl(meth)acrylate, or 4-isocyanatebutyl(meth)acrylate.

(2) Compound having a blocked isocyanate group: A 2-butanoneoxime adduct of 2-isocyanateethyl (meth)acrylate, a pyrazole adduct of 2-isocyanateethyl(meth)acrylate, a 3,5-dimethylpyrazole adduct of 2-isocyanateethyl(meth)acrylate, a 3-methylpyrazole adduct of 2-isocyanateethyl(meth)acrylate, an ε-caprolactam adduct of 2-isocyanateethyl(meth)acrylate, a 2-butanoneoxime adduct of 3-isocyanatepropyl(meth)acrylate, a pyrazole adduct of 3-isocyanatepropyl(meth)acrylate, a 3,5-dimethylpyrazole adduct of 3-isocyanatepropyl(meth)acrylate, a 3-methylpyrazole adduct of 3-isocyanatepropyl(meth)acrylate, an ε-caprolactam adduct of 3-isocyanatepropyl(meth)acrylate, a 2-butanoneoxime adduct of 4-isocyanatebutyl(meth)acrylate, a pyrazole adduct of 4-isocyanatebutyl(meth)acrylate, a 3,5-dimethylpyrazole adduct of 4-isocyanatebutyl(meth)acrylate, a 3-methylpyrazole adduct of 4-isocyanatebutyl(meth)acrylate, or an ε-caprolactam adduct of 4-isocyanatebutyl(meth)acrylate.

(3) Compound having a urethane bond: Triallyl isocyanurate, a tolylene diisocyanate adduct of 3-phenoxy-2-hydroxypropyl acrylate, a hexamethylene diisocyanate adduct of 3-phenoxy-2-hydroxypropyl acrylate, or a hexamethylene diisocyanate adduct of pentaerythritol triacrylate.

(4) Compound having an alkoxysilyl group: 3-methacryloyloxypropyl trimethoxysilane, 3-methacryloyloxypropyl dimethoxymethylsilane, 3-methacryloyloxypropyl triethoxysilane, 3-methacryloyloxypropyl diethoxyethylsilane, vinyl trimethoxysilane, etc.

(5) Compound having an epoxy group: Glycidyl(meth)acrylate, or polyoxyalkylene glycol monoglycidyl ether (meth)acrylate.

(6) Compound having an N-methylol group or an N-alkoxymethyl group: N-methylol(meth)acrylamide, N-methoxymethyl(meth)acrylamide, N-ethoxymethyl(meth)acrylamide or N-butoxymethyl(meth)acrylamide.

Among them, the polymer (d) is preferably the above (2) i.e. a compound having a blocked isocyanate group, particularly preferably a 3,5-dimethylpyrazole adduct of 2-isocyanateethyl methacrylate.

As the monomer (d), one type may be used alone, or two or more types may be used in combination.

Other Monomer (e)

The polymer (A) may have constituting units based on other monomer (e) other than the monomers (a) to (d). The monomer (e) preferably has no polyfluoroalkyl group in which the number of carbon atoms to which fluorine atoms are bonded is at least 7.

As the monomer (e), the following compounds may be mentioned.

Methyl acrylate, ethyl acrylate, propyl acrylate, butyl methacrylate, cyclohexyl(meth)acrylate, 2-ethylhexyl(meth)acrylate, n-hexyl(meth)acrylate, vinyl acetate, vinyl propionate, butene, isopurene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentyl acetoxyethylene, styrene, a-methylstyrene, p-methylstyrene, hexylstyrene, octylstyrene, nonylstyrene, chloroprene, tetrafluoroethylene or vinylidene fluoride.

Vinyl alkyl ether, halogenated alkyl vinyl ether, vinyl alkyl ketone, benzyl(meth)acrylate, octyl(meth)acrylate, decyl methacrylate, cyclododecyl acrylate, 3-ethoxypropyl acrylate, methoxybutyl acrylate, 2-ethylbutyl acrylate, 1,3-dimethylbutyl acrylate or 2-methylpentyl acrylate.

The proportion of the monomer (a) is from 30 to 80 mass %, preferably from 40 to 60 mass % based on 100 mass % of all the monomer components (Z) to be used for preparation of the fluorocopolymer (A) in view of oil repellency and antifouling property.

The proportion of the monomer (b) is from 20 to 70 mass %, preferably from 40 to 60 mass % based on the monomer components (Z) (100 mass %) in view of the oil repellency and the antifouling property.

In a case where the monomer (b) comprises the monomer (b1) and the monomer (b2), the proportion of the monomer (b1) is preferably from 15 to 40 mass %, more preferably from 20 to 35 mass % based on the monomer components (Z) (100 mass %) in view of the antifouling property.

The proportion of the monomer (b2) is preferably from 1 to 20 mass %, more preferably from 1.5 to 15 mass % based on the monomer components (Z) (100 mass %) in view of the dispersion stability and the uniform adsorption property to the substrate.

The monomer (b) more preferably comprises the monomer (b1), the monomer (b2) and the monomer (b3). In such a case, the proportion of the monomer (b1) is preferably from 15 to 40 mass %, more preferably from 20 to 35 mass % based on the monomer components (Z) (100 mass %) in view of the antifouling property.

The proportion of the monomer (b2) is preferably from 1 to 20 mass %, more preferably from 1.5 to 15 mass % based on the monomer components (Z) (100 mass %) in view of the dispersion stability and the uniform adsorption properties to the substrate.

The proportion of the monomer (b3) is preferably from 5 to 25 mass %, more preferably from 10 to 20 mass % based on the monomer components (Z) (100 mass %) in view of the durability against washing and the antifouling property.

The proportion of the monomer (d) is preferably from 0 to 5 mass %, more preferably from 0.5 to 5 mass %, furthermore preferably from 0.5 to 4 mass % based on the monomer components (Z) (100 mass %) in view of the oil repellency and the durability against washing.

Surfactant (c)

The surfactant (c) is a compound (I) represented by the above formula (I) and is an ethylene oxide adduct of 2,4,7,9-tetramethyl-5-decyne-4,7-diol. The compound (I) has an acetylene group in its center and has a symmetric main chain structure. In the formula (I), each of $x1$ and $x2$ represents the number (chain length) of ethylene oxide (EO) added, and is an integer of at least 1. $(x1+x2)$ represents the number of addition of ethylene oxide (hereinafter sometimes referred to as an EO addition number) in one molecule and is represented by the average value in one type of the compound (I). The EO addition number $(x1+x2)$ in one type of the compound (I) is at least 2 and at most 30.

As the surfactant (c), two or more types of compounds (I) represented by the above formula (I) differing in the EO addition number $(x1+x2)$ may be used in combination.

The average value of the EO addition number per one molecule in the entire surfactant (c) is at least 6. When the average value is at least 6, good aqueous dispersibility of the fluorocopolymer (A) is likely to be obtained.

Among the compounds (I) represented by the above formula (I), a compound wherein the EO addition number $(x1+x2)$ is at least 9 is effective for improving the aqueous dispersibility of the fluorocopolymer (A) and for suppressing bubbles at the time of removing the solvent, and a compound wherein $(x1+x2)$ is at least 20, has an excellent effect for improving the durability against washing in addition.

In order to achieve good aqueous dispersibility of the fluorocopolymer (A), the compound (I) wherein $(x1+x2)$ is at least 9 is contained preferably in an amount of at least 50 mass % based on 100 mass % of the surfactant (c).

In a case where one type of the compound (I) is used as the surfactant (c), the EO addition number $(x1+x2)$ in the compound is preferably from 6 to 30, more preferably from 9 to 30, furthermore preferably from 20 to 30.

The compound (I) represented by the above formula (I) may be commercially available. For example, a proper EO adduct may be selected among SURFYNOL (product series) manufactured by Air Products and Chemicals and OLFINE (product series) manufactured by Nissin Chemical Industry Co., Ltd. Such EO adducts are known as nonionic surfactants improving wettability.

As commercial products wherein the EO addition number $(x1+x2)$ is at least 9, SURFYNOL 465 (EO addition number: 10) and SURFYNOL 485 (EO addition number: 30) manufactured by Air Products and Chemicals and OLFINE E1010

(EO addition number: 10) manufactured by Nissin Chemical Industry Co., Ltd. may, for example, be mentioned.

The content of the surfactant (c) is preferably from 3 to 30 parts by mass, more preferably from 5 to 15 parts by mass per 100 parts by mass of the fluorocopolymer (A).

When the addition amount of the surfactant (c) is at least 3 parts by mass, its addition effect will be sufficiently obtained, and when it is at most 30 parts by mass, no adverse effect such as a decrease in the oil repellency and the antifouling property will not show.

The surfactant (c) may be added in a step of solution polymerization for the fluorocopolymer (A) or may be added after polymerization for the fluorocopolymer (A). In a case of addition in the step of solution polymerization for the fluorocopolymer (A), the addition amount of the surfactant (c) is preferably from 3 to 30 parts by mass, more preferably from 5 to 15 parts by mass based on 100 parts by mass of the monomer components (Z) used for the polymerization.

Additives (Crosslinking Agent, Catalyst)

In the antifouling composition, a crosslinking agent, a catalyst, etc. may be contained in order to improve the adhesion to a substrate by forming crosslinkage with the substrate.

Such a crosslinking agent is preferably at least one crosslinking agent selected from the group consisting of an isocyanate crosslinking agent, a melamine crosslinking agent, a carbodiimide crosslinking agent and an oxazoline crosslinking agent.

As specific examples of the isocyanate crosslinking agent, an aromatic block type isocyanate crosslinking agent, an aliphatic block type isocyanate crosslinking agent, an aromatic non-block type isocyanate crosslinking agent and an aliphatic non-block type isocyanate crosslinking agent may, for example, be mentioned. Such isocyanate crosslinking agents are preferably aqueous dispersion type emulsified by a surfactant, self aqueous dispersion type having hydrophilic groups, etc.

As specific examples of the melamine crosslinking agent, urea or a condensate of preliminary condensate of melamine formaldehyde, a methylol-dihydroxyethylene-urea or its derivative, uron, methylol-ethylene-urea, methylol-propylene-urea, methylol-triazone, a dicyandiamide-formaldehyde condensate, methylol-carbamate, methylol-(meth)acrylamide, and a polymer thereof, may, for example, be mentioned.

The carbodiimide crosslinking agent is a polymer having carbodiimide groups in its molecule and is a crosslinking agent having excellent reactivity with carboxy groups, amino groups and active hydrogen groups in the substrate or the antifouling agent.

The oxazoline crosslinking agent is a polymer having oxazoline groups in its molecule, and is a crosslinking agent having excellent reactivity with carboxy groups in the substrate or the antifouling agent.

Further, as other crosslinking agent, divinylsulfone, polyamide or its cation derivative, an epoxy derivative such as diglycidyl glycerol, a halide derivative such as (epoxy-2,3-propyl)trimethylammonium chloride or N-methyl-N-(epoxy-2,3-propyl)morpholinium chloride, a pyridinium salt of chloromethyl ether of ethylene glycol, a polyamine-polyamide-epichlorohydrin resin, polyvinyl alcohol or its derivative, polyacrylamide or its derivative, and a glyoxal resin anticrease agent may, for example, be mentioned.

In a case where the melamine crosslinking agent or the glyoxal resin anticrease agent is contained in the antifouling composition, a catalyst is preferably contained. As a preferred catalyst, an inorganic amine salt or an organic amine salt may, for example, be mentioned. The inorganic amine salt may, for example, be ammonium chloride. The organic amine salt may, for example, be an aminoalcohol hydrochloride or semicarbazide hydrochloride. The aminoalcohol hydrochloride may, for example, be monoethanolamine hydrochloride, diethanolamine hydrochloride, triethanol hydrochloride or 2-amino-2-methylpropanol hydrochloride.

(Water/Oil Repellent)

A water/oil repellent may be contained in the antifouling composition, whereby a water/oil repellent antifouling composition having both water/oil repellency and antifouling property can be obtained.

The water/oil repellent may be one imparting water/oil repellency by a fluorocopolymer not included in the above polymer (A) or may be a water/oil repellent containing no fluorine. It is more preferred to use a fluorocopolymer not included in the polymer (A).

To impart both conflicting properties i.e. the antifouling property by the polymer (A) having hydrophilic groups and the water repellency by a fluoropolymer imparting water/oil repellency, is a function which has been widely desired. The antifouling composition of the present invention comprises the surfactant (c), whereby infiltration of the antifouling composition into an article will be improved. Further, the surfactant (c) is characterized by not inhibiting water repellency as it has a structure having an acetylene group at its center and as a result, excellent water/oil repellent antifouling performance can be obtained by using the polymer (A) having hydrophilic groups and a fluoropolymer imparting water/oil repellency in combination.

As the fluoropolymer not included in the polymer (A), capable of imparting water/oil repellency, the following polymer ($\alpha$) or a mixture of the polymer ($\alpha$) and a polymer ($\beta$) is preferably used.

[Polymer ($\alpha$)]: A polymer ($\alpha$) comprising constituting units based on at least one monomer (f) selected from the group consisting of the following monomer (f1), monomer (f2) and monomer (f3), and constituting units based on the above monomer (a), the proportion of fluorine atoms in the polymer (100 mass %) being at least 15 mass % and less than 45 mass %.

Monomer (f1): A monomer having no polyfluoroalkyl group and having an alkyl group having at least 12 carbon atoms.

Monomer (f2): Vinyl chloride.

Monomer (f3): Vinylidene chloride.

[Polymer ($\beta$)]: A polymer ($\beta$) comprising constituting units based on at least one monomer (f) selected from the group consisting of the above monomer (f1), monomer (f2) and monomer (f3), and constituting units based on the above monomer (a), the proportion of fluorine atoms in the polymer (100 mass %) being at least 45 mass %.

The monomer (f1) is preferably a monomer having a $C_{12-36}$ alkyl group, more preferably a (meth)acrylate having a $C_{12-24}$ alkyl group, particularly preferably stearyl(meth)acrylate or behenyl(meth)acrylate.

Each of the polymers ($\alpha$) and ($\beta$) may further have constituting units based on the above monomer (d). For example, N-methylol(meth)acrylamide, a 3,5-dimethylpyrazole adduct of 2-isocyanateethyl(meth)acrylate or the like is preferred.

Each of the polymers ($\alpha$) and ($\beta$) may have constituting units based on other monomer (g) not included in any of the above monomers (a), (b), (d) and (f). The monomer (g) may, for example, be preferably dioctyl malate.

The polymer (α) is preferably the following polymer (α1). The polymer (β) is preferably the following polymer (β1).

[polymer (α1)]: A polymer (α1) comprising constituting units based on the above monomer (a), constituting units based on the monomer (f1), and constituting units based on the monomer (f2) or (f3), the proportion of fluorine atoms in the polymer (100 mass %) being at least 15 mass % and less than 45 mass %.

Polymer (β1): A polymer (β1) comprising constituting units based on the above monomer (a), constituting units based on the above monomer (f1) and constituting units based on the monomer (f2) or (f3), the proportion of fluorine atoms in the polymer (100 mass %) being at least 45 mass %.

The polymers (α) and (β) can be produced in the same procedure as in the after-mentioned process for producing the polymer (A).

(Other Additives)

Known various additives may be contained in the antifouling composition. Such additives may, for example, be a non-fluorinated polymer blender, a water soluble polymer resin (such as a hydrophilic polyester or its derivative, a hydrophilic polyethylene glycol or its derivative, or a polycarboxylic acid or its derivative), a penetrating agent, a defoaming agent, a film forming assistant, an insecticide, a flame retardant, an antistatic agent, an anticrease agent, a softener, a pH adjusting agent, etc.

Now, the process for producing the antifouling composition of the present invention will be described.

Production of Fluorocopolymer (A)

First, monomer components (Z) containing the monomers (a) and (b) and as the case requires, the monomers (d) and (e) are subjected to polymerization reaction to form a fluorocopolymer (A). The polymerization reaction is carried out by a method of solution polymerization in an organic solvent (polymerization solvent) containing a volatile organic solvent having a boiling point of at most 100° C. in the presence of the surfactant (c).

The proportion of the volatile organic solvent having a boiling point of at most 100° C. in the organic solvent is preferably at least 50 mass %, more preferably at least 80 mass %.

Further, the organic solvent may contain an organic solvent having low volatility having a boiling point higher than 100° C., such as dipropylene glycol or tripropylene glycol.

The volatile organic solvent having a boiling point of at most 100° C. may, for example, be acetone, methyl ethyl ketone, methanol, 2-propanol, ethyl acetate, diisopropyl ether or tetrahydrofuran. Among them, more preferred is acetone in view of the solubility of the polymer and easiness of removal by volatilization.

The organic solvent having low volatility having a boiling point higher than 100° C. may, for example, be a glycol ether such as an ethyl ether or a methyl ether of ethylene glycol, propylene glycol, diethylene glycol, dipropylene glycol, tripropylene glycol or dipropylene glycol, or its derivative, an aliphatic hydrocarbon, or an aromatic hydrocarbon.

The polymerization solvents may be used as a mixture of two or more.

In the production process of the present invention, solution polymerization is carried out in the presence of a surfactant (c). Specific embodiment of the preferred surfactant (c) is as described above.

When solution polymerization is carried out, when the polymer (A) is prepared by solution polymerization in the presence of the surfactant (c), the dispersion stability of the polymer (A) in the solution will be improved.

In the polymerization reaction to obtain the polymer (A), a polymerization initiator is preferably used. The polymerization initiator is preferably a peroxide such as benzyl peroxide, lauryl peroxide, succinyl peroxide or tert-butyl perpivarate; an azo compound, or the like. The concentration of the polymerization initiator in the solvent is preferably from 0.1 to 1.5 parts by mass based on 100 parts by mass of the monomer components (Z).

As specific examples of the polymerization initiator, 2,2'-azobis-2-methylbutyronitrile, dimethyl-2,2'-azobisisobutyrate, 2,2'-azobis[2-(2-imidazolyn-2-yl)propane], 2,2'-azobis(4-methoxy-2,4-dimethylvaleronitrile), 1,1'-azobis(2-cyclohexane-1-carbonitrile), 2,2'-azobis(2,4-dimethylvaleronitrile), 1,1'-azobis(1-acetoxy-1-phenylethane), dimethylazobisisobutyrate, 4,4'-azobis(4-cyanovaleric acid), etc. are preferred, and 4,4'-azobis(4-cyanovaleric acid) is more preferred.

Since 4,4'-Azobis(4-cyanovaleric acid) has carboxy groups capable of being anionic groups, by using it as a polymerization initiator, anionic properties may be introduced to the terminal of the main chain. Particularly when the polymer (A) has constituting units based on the monomer (b2), the polymer preferably has an anionic group at the terminal of the main chain.

When constituting units based on the monomer (b2) having an amino group are introduced to the polymer (A), the dispersibility of the polymer (A) in the aqueous medium and uniform adhesion to the fibrous substrate will be improved. On the other hand, since an amino group is cationic, soil components are likely to be adsorbed and as a result, the soil release property (SR property) tends to be decreased. Whereas, by introducing an anionic group to the terminal of the main chain of the polymer (A), adsorption of the soil components is suppressed, thus improving the soil release property (SR property).

Further, in a case where a crosslinking agent having high reactivity with a carboxy group is used in combination, the crosslinked moiety corresponds to the terminal of the main chain, whereby the flowability of the main chain will not be inhibited, and the molecular movement required for the soil release property will be maintained, and as a result, both good soil release property and durability against washing can be satisfied.

It is preferred to employ a chain transfer agent in the polymerization reaction to adjust the polymerization degree (molecular weight) of the polymer (A). By using such a chain transfer agent, there is also such an effect that the total concentration of monomers in the solvent can be increased. The chain transfer agent may, for example, preferably be an alkylmercaptan such as tert-dodecyl mercaptan, n-dodecyl mercaptan or stearyl mercaptan; aminoethanethiol, mercaptoethanol, 3-mercaptopropionic acid, 2-mercaptopropionic acid, thiomalic acid, thioglycolic acid, 3,3'-dithio-dipropionic acid, 2-ethylhexyl thioglycolate, n-butyl thioglycolate, methoxybutyl thioglycolate, ethyl thioglycolate, 2,4-diphenyl-4-methyl-1-pentene or carbon tetrachloride.

Among them, preferred is 3-mercaptopropionic acid, 2-mercaptopropionic acid, thiomalic acid, thioglycolic acid or 3,3'-dithio-dipropionic acid, the terminal of the main chain of which has a carboxy group capable of being an anionic group, particularly preferred is 3-mercaptopropionic acid. The amount of the chain transfer agent to be used is preferably from 0 to 2 parts by mass based on 100 parts by mass of the monomer components (Z).

The reaction temperature during the polymerization reaction is preferably within a range of from room temperature to the boiling point of the reaction mixture. With a view to efficiently using the polymerization initiator, it is preferably the vicinity of the half life temperature of the polymerization initiator, more preferably from 30 to 90° C.

Then, after the solution polymerization reaction of the polymer (A), the volatile organic solvent is volatilized and in addition, an aqueous medium is added to remove the polymerization solvent to form an aqueous dispersion. In a case where the organic solvent contains an organic solvent having low volatility having a boiling point higher than 100° C., the organic solvent having low volatility will remain in the aqueous dispersion. The removal of the polymerization solvent is carried out by stripping (volatilization) treatment. By carrying out the step of stripping (volatilization) treatment in the presence of the surfactant (c), foamability will be suppressed and the time efficiency will be shortened. Further, a small amount of an aqueous defoaming agent may be used in combination to obtain a further defoaming effect.

The aqueous medium in this specification means a liquid containing water and having a content of the volatile organic solvent of at most 1 mass %.

In a case where the composition of the present invention is an aqueous dispersion, the content of the volatile organic solvent is preferably at most 1 mass %, most preferably 0. In this specification, the volatile organic solvent in the antifouling composition means an organic solvent which will be volatilized when the composition of the present invention is stored at room temperature, and specifically, it is an organic solvent having a boiling point under $1 \times 10^{-5}$ Pa (hereinafter simply referred to as "boiling point") of at most 100° C.

In a case where the polymer (A) contains constituting units (b2) having an amino group, it is preferred, after the polymer (A) is obtained by polymerization reaction of the monomers, to convert amino groups in the polymer (A) to an amine salt, whereby the dispersibility of the polymer (A) in an aqueous medium will be improved.

For the conversion to an amine salt, an acid or the like is preferably used, and an acid having a dissociation constant or a primary dissociation constant of at least $10^{-5}$ is more preferably used. As the acid, hydrochloric acid, hydrobromic acid, sulfonic acid, nitric acid, phosphoric acid, acetic acid, formic acid, propionic acid, lactic acid or the like is preferred, and acetic acid is more preferred.

Further, instead of conversion of amino groups in the polymer (A) to an amine salt by using an acid, conversion to a quaternary ammonium salt (also called conversion to a quaternary salt) may be carried out by using methyl iodide, ethyl iodide, dimethyl sulfate, diethyl sulfate, benzyl chloride, trimethyl phosphate, methyl p-toluenesulfonate or the like.

The number average molecular weight of the polymer (A) by GPC is preferably from 3,000 to 40,000, more preferably from 6,000 to 30,000. The mass average molecular weight is preferably from 6,000 to 80,000, more preferably from 10,000 to 50,000.

When the molecular weight of the polymer (A) is at most the upper limit of the above range, excellent dispersion stability will be obtained, and when it is at least the lower limit, excellent water/oil repellency and adhesion to the substrate will be obtained.

Preparation of Antifouling Composition

To the aqueous dispersion of the polymer (A) thus obtained, additives are added as the case requires, followed by uniform mixing, to obtain an antifouling composition.

The antifouling composition of the present invention may be used as a treating liquid to be applied for treatment of an article as it is. Otherwise, the antifouling composition is diluted to a proper solid content concentration and then applied to an article.

The solid content concentration of the antifouling composition (100 mass %) when applied for treatment of an article, is preferably from 0.2 to 5 mass %, more preferably from 0.5 to 3 mass %.

The solid content concentration in the antifouling composition of the present invention is a value calculated from the mass before heating and the mass after dried in a convection drier at 120° C. for 4 hours, and the solid content mainly comprises the polymer (A) and the surfactant (c).

<Article>

The article of the present invention is an article treated with the antifouling composition of the present invention.

The article to be treated with the antifouling composition of the present invention may, for example, be fiber, fiber fabric, knitted fabric, nonwoven fabric, glass, paper, wood, leather, artificial leather, stone, concrete, ceramic, metal or metal oxide, ceramic product, plastics, etc.

The treating method is not particularly limited so long as it is a method capable of attaching the antifouling composition to the article. For example, a method is preferred which comprises applying it to the surface of a substrate by a known coating method such as coating, impregnation, immersion, spraying, brushing, padding, size press coating or roller coating, followed by drying. The drying may be carried out at room temperature or under heating, and is preferably carried out under heating. In the case of heating, the temperature is at a level of from 40 to 200° C. Further, in a case where the antifouling composition contains a crosslinking agent, it is preferred to carry out curing by heating at a temperature of at least the crosslinked temperature of the crosslinking agent, as the case requires.

According to the present invention, by using the polymer (A) having specific constituting units and the surfactant (c) having a specific structure in combination, an antifouling composition which can impart excellent oil repellency and antifouling property to the surface of an article can be obtained, even though the $R^f$ group in the composition is a short chain.

In production of the fluorocopolymer (A) in a volatile organic solvent by solution polymerization, by the presence of the surfactant (c), the dispersion stability of the polymer (A) in the solution will be improved. Accordingly, the concentration of the polymer (A) in the solution can be made high, whereby the solution polymerization concentration can be increased. As a result, the amount of the organic solvent to be used for the polymerization can be reduced, thus leading to a reduction in the production cost. Further, use of a large amount of a chain transfer agent and an initiator which may have influence over the performance can be avoided.

In the present invention, after the solution polymerization, the used organic solvent is volatilized and water is added to convert the solution to an aqueous dispersion. On that occasion, it is preferred that the polymerization concentration in solution polymerization is high and that the amount of the solvent used is small, whereby the amount of the solvent to be removed by volatilization is small, such being efficient.

Further, at the time of volatilization of the solvent, by the presence of the surfactant (c), formation of bubbles is suppressed, such being excellent in operation efficiency. The surfactant (c) has an EO chain, and in general, such a surfactant is considered to have a small defoaming effect. However, in the present invention, a good defoaming effect can be obtained by combination with a specific polymer (A), which is a surprising founding.

Further, by the presence of the surfactant (c) in the aqueous dispersion (antifouling composition), the dispersion stability of the polymer (A) will be excellent, and in addition, excellent permeability of the antifouling composition will be obtained, whereby good wettability to various articles can be obtained. As a result, an excellent antifouling property can be imparted to an article.

Further, since the article of the present invention is treated with an antifouling composition capable of imparting excellent oil repellency and antifouling property to the surface of an article, in which the $R^f$ group is a short chain, it imposes a low environmental burden and has good oil repellency and antifouling property.

Further, the antifouling composition of the present invention comprises, as the main component, a polymer having constituting units based on a monomer having a polyfluoroalkyl group having from 4 to 6 carbon atoms, whereby it is possible to bring the content of perfluorooctanoic acid (PFOA), perfluorooctanesulfonic acid (PFOS) and derivatives thereof, of which the influences over the environment are considered, to a level of not: higher than the lower detection limit.

EXAMPLES

Now, the present invention will be described in further detail with reference to Examples, but it should be understood that the present invention is by no means restricted to such specific Examples. In the following, "%" means "mass %" unless otherwise specified. Further, in a chemical formula representing a compound containing an alkylene oxide chain, the value of the alkylene oxide chain length is an average value.

Examples for Solution Polymerization, and Volatilization of Solvent and Conversion to Aqueous Dispersion Monomers and starting materials used shown in Tables 1 and 2 are as follows.
Monomer (a):
C6FMA: $C_6F_{13}C_2H_4OCOC(CH_3)=CH_2$ (purity: 99.7 mass %).
Monomer (b1):
MEO400M: $CH_2=C(CH_3)COO(EO)_9CH_3$.
Monomer (b2):
DM: N,N-dimethylaminoethyl methacrylate.
Monomer (b3):
MEOTO800: $CH_2=C(CH_3)COO-(-(EO)_{10}-(TO)_5-)-H$ (EO and TO are randomly contained).
Monomer (d):
iso: a 3,5-dimethylpyrazole adduct of 2-isocyanateethyl methacrylate.
Polymerization Initiator:
ACP: 4,4'-azobis(4-cyanovaleric acid).
Chain Transfer Agent:
3MP: 3-mercaptopropionic acid.
Surfactant (c1):
SFY465: an ethylene oxide adduct (EO addition number: 10) of 2,4,7,9-tetramethyl-5-decyne-4,7-diol.
Surfactant (c2):
SFY485: an ethylene oxide adduct (EO addition number: 30) of 2,4,7,9-tetramethyl-5-decyne-4,7-diol.
Additives:
SFY104: 2,4,7,9-tetramethyl-5-decyne-4,7-diol (no EO addition).
SFY420: an ethylene oxide adduct (EO addition number: 1.3) of 2,4,7,9-tetramethyl-5-decyne-4,7-diol.
SFY440: an ethylene oxide adduct (EO addition number: 3.5) of 2,4,7,9-tetramethyl-5-decyne-4,7-diol.
PEG400: polyethylene oxide (average of EO chain length: 9).
M400: single-end methoxypolyethylene oxide (average of EO chain length: 9).
E420: polyethylene oxide oleyl ether (EO addition number: 13.5).
TDA9: tridecyl alcohol ethylene oxide adduct (EO addition number: 9).
P204: ethylene oxide propylene oxide polymerized product (proportion of EO: 40 mass %).
AQ18: monostearyl trimethyl ammonium chloride.
DM10: N,N-dimethyldecylamine oxide.
Organic Solvent:
Acetone.
DPG: dipropylene glycol.
TPG: tripropylene glycol.
Others (not shown in Tables):
Water: deionized water.
Acetic acid.

Examples 1 to 3 and Comparative Examples 1 to 15

Monomers were subjected to solution polymerization in proportions as identified in Table 1 or 2 to form a fluorocopolymer, and an aqueous medium was added and the organic solvent was removed by volatilization to obtain an aqueous dispersion of the fluorocopolymer.

In each Example, (1) the state of the solution after the polymerization, (2) the number of bubbles at the time of conversion to an aqueous dispersion by volatilization of the solvent, and (3) the stability of the final aqueous dispersion, were visually observed and evaluated with respect to the following items. The evaluation results are shown in Table 3. In Table 3, the solid content concentration (unit: mass %) in the polymer solution after the solution polymerization is also shown.

(1) The state of the solution after the polymerization: The polymer is uniformly dispersed or gelated.

(2) The number of bubbles at the time of conversion to an aqueous dispersion by volatilization of the solvent: In a step of adding the aqueous medium and removing the organic solvent by volatilization, the number of bubbles is large, slightly large, or small.

(3) The stability of the final aqueous dispersion: In the aqueous dispersion obtained by removing the organic solvent by volatilization, the fluorocopolymer is uniformly dispersed, the dispersion is turbid, or precipitates are formed.

In Tables, "NA" means unmeasured.

Example 1

In a 100 mL glass container, 16.6 g (54 parts by mass) of C6FMA, 8.0 g (26 parts by mass) of MEO400M, 4.6 g (15 parts by mass) of MEOTO800, 0.9 g (3 parts by mass) of CM, 0.6 g (2 parts by mass) of iso, 3.1 g (10 parts by mass) of SFY465, 45.9 g (150 pads by mass) of acetone as a polymerization solvent, 0.24 g (0.8 part by mass) of ACP and 0.18 g (0.6 part by mass) of 3MP were charged, and polymerization was carried out with shaking in a nitrogen atmosphere at 65°

C. for 15 hours to obtain a pale yellow solution (polymer solution) having a solid content concentration of 42.3 mass %.

The molecular weight of the obtained polymerized product was confirmed by GPC, whereupon the number average molecular weight was 14,000 and the mass average molecular weight was 28,000. Further, by this measurement, absence of peaks derived from the monomers was also confirmed.

To 50 g of the obtained polymer solution, 50 g of water and 0.33 g (1.5 times by molar equivalent of DM) of acetic acid were added, followed by stirring to carry out conversion to an amine salt. Then, acetone was removed under reduced pressure conditions at 50° C. to obtain a pale yellow transparent aqueous dispersion, and then deionized water was added to adjust the solid content concentration to 20 mass %. The obtained aqueous dispersion was subjected to measurement by capillary gas chromatography, whereupon the acetone content was confirmed to be at most 1 mass %.

Example 2

An aqueous dispersion was obtained in the same manner as in Example 1 except that SFY485 was used instead of SFY465.

Example 3

In this Example, the amount of acetone used was reduced to increase the polymerization concentration as compared with Example 1.

That is, in a 100 mL glass container, 19.6 g (54 parts by mass) of C6FMA, 9.4 g (26 parts by mass) of MEO400M, 5.4 g (15 parts by mass) of MEOTO800, 1.1 g (3 parts by mass) of DM, 0.7 g (2 parts by mass) of iso, 3.6 g (10 parts by mass) of SFY465, 39.7 g (110 parts by mass) of acetone as a polymerization solvent, 0.29 g (0.8 part by mass) of ACP, and 0.22 g (0.6 part by mass) of 3MP were charged, and polymerization was carried out with shaking in a nitrogen atmosphere at 65° C. for 15 hours to obtain a pale yellow solution (polymer solution) having a solid content concentration of 50.4 mass %.

The molecular weight of the obtained polymer was confirmed by GPC, whereupon the number average molecular weight was 18,000 and the mass average molecular weight was 30,000. Further, by this measurement, absence of peaks derived from the monomers was also confirmed. Then, in the same manner as in Example 1, an aqueous dispersion was obtained.

Comparative Example 1

In this Example, no surfactant was used, and as the organic solvent, only acetone was used in the same manner as in Example 1.

That is, in a 100 mL glass container, 18.1 g (54 parts by mass) of C6FMA, 8.7 g (26 parts by mass) of MEO400M, 5.0 g (15 parts by mass) of MEOTO800, 1.0 g (3 parts by mass) of DM, 0.7 g (2 parts by mass) of iso, 46.1 g (138 parts by mass) of acetone as a polymerization solvent, 0.27 g (0.8 part by mass) of ACP and 0.2 g (0.6 part by mass) of 3MP were charged, and polymerization was carried out with shaking in a nitrogen atmosphere at 65° C. for 15 hours to obtain a pale yellow solution (polymer solution) having a solid content concentration of 42.7 mass %.

The molecular weight of the obtained polymerized product was confirmed by GPC, whereupon the number average molecular weight was 21,000, and the mass average molecular weight was 32,000. Further, by this measurement, absence of peaks derived from the monomers was also confirmed. Then, in the same manner as in Example 1, an aqueous dispersion was obtained.

Comparative Example 2

In this Example, no surfactant was used and as the organic solvent, only acetone was used in the same manner as in Example 1. The amount of used acetone was reduced to increase the polymerization concentration as compared with Comparative Example 1.

That is, in a 100 mL glass container, 21.5 g (54 parts by mass) of C6FMA, 10.3 g (26 parts by mass) of MEO400M, 5.6 g (15 parts by mass) of MEOTO800, 1.2 g (3 parts by mass) of DM, 0.8 g (2 parts by mass) of iso, 39.7 g (100 parts by mass) of acetone as a polymerization solvent, 0.32 g (0.8 part by mass) of ACP and 0.24 g (0.6 part by mass) of 3MP were charged, and polymerization was carried out with shaking in a nitrogen atmosphere at 65° C. for 15 hours to obtain a pale yellow highly viscous solution (polymer solution) having a solid content concentration of 50.2 mass %. Formation of precipitates was confirmed after the polymer solution was left at rest at room temperature.

The molecular weight of the obtained polymerized product was confirmed by GPC, whereupon the number average molecular weight was 34,000, and the mass average molecular weight was 47,000. Further, by this measurement, absence of peaks derived from the monomers was also confirmed. Then, in the same manner as in Example 1, an aqueous dispersion was obtained.

Comparative Example 3

In this Example, no surfactant was used and as an organic solvent, acetone and dipropylene glycol (DPG) were used.

That is, in a 100 mL glass container, 18.1 g (54 parts by mass) of C6FMA, 8.7 g (26 parts by mass) of MEO400M, 5.0 g (15 parts by mass) of MEOTO800, 1.0 g (3 parts by mass) of DM, 0.7 g (2 parts by mass) of iso, 39.4 g (118 parts by mass) of acetone as a polymerization solvent and 6.7 g (20 parts by mass) of DPG, 0.27 g (0.8 part by mass) of ACP and 0.2 g (0.6 part by mass) of 3MP were charged, and the polymerization was carried out with shaking in a nitrogen atmosphere at 65° C. for 15 hours to obtain a pale yellow solution (polymer solution) having a solid content concentration of 42.6 mass %.

The molecular weight of the obtained polymerized product was confirmed by GPC, whereupon the number average molecular weight was 24,000, and the mass average molecular weight was 33,000. Further, by this measurement, absence of peaks derived from the monomers was also confirmed. Then, in the same manner as in Example 1, an aqueous dispersion was obtained.

Comparative Example 4

In this Example, no surfactant was used, and as an organic solvent, acetone and tripropylene glycol (TPG) were used.

That is, an aqueous dispersion was obtained in the same manner as in Comparative Example 2 except that TPG was used instead of DPG.

Comparative Example 5

In this Example, as an organic solvent, acetone and dipropylene glycol (DPG) were used Further, the amount of used acetone was reduced to increase the polymerization concentration as compared with Comparative Example 2.

The polymerization reaction was carried out in the same manner as in Comparative Example 2 except that 39.7 g (100 parts by mass) of acetone was changed to 31.8 g (80 parts by mass) of acetone and 7.9 g (20 parts by mass) of DPG. The obtained polymer solution was in a gelated state by high viscosity, and the following preparation of an aqueous dispersion could not be carried out.

Comparative Example 6

In this Example, instead of the surfactant (c), an additive (SFY104) having the same main chain structure as that of the surfactant (c) and having no ethylene oxide added was used.

That is, in a 100 mL glass container, 16.6 g (54 parts by mass) of C6FMA, 8.0 g (26 parts by mass) of MEO400M, 4.6 g (15 parts by mass) of MEOTO800, 0.9 g (3 parts by mass) of DM, 0.6 g (2 parts by mass) of iso, 3.1 g of SFY104, 45.9 g (150 parts by mass) of acetone as a polymerization solvent, 0.24 g (0.8 part by mass) of ACP and 0.18 g (0.6 part by mass) of 3MP were charged, and the polymerization was carried out with shaking in a nitrogen atmosphere at 65° C. for 15 hours to obtain a pale yellow solution (polymer solution) having a solid content concentration of 42.1 mass %.

The molecular weight of the obtained polymerized product was confirmed by GPC, whereupon the number average molecular weight was 13,000, and the mass average molecular weight was 26,000. Further, by this measurement, absence of peaks derived from the monomers was also confirmed. Then, in the same manner as in Example 1, an aqueous dispersion was obtained.

Comparative Examples 7 to 15

In these Examples, as shown in Table 2, additives not included in the surfactant (c) were used instead of the surfactant (c). In the same manner as in Comparative Example 6 except for the change, a final aqueous dispersion was prepared.

TABLE 1

| Starting material | Abbreviated name | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|---|
| Monomer (a) | C6FMA | 54 | 54 | 54 | 54 | 54 | 54 | 54 | 54 |
| Monomer (b1) | MEO400 | 26 | 26 | 26 | 26 | 26 | 26 | 26 | 26 |
| Monomer (b2) | DM | 3 | 3 | 3 | 3 | 3 | 3 | 3 | 3 |
| Monomer (b3) | MEOTO800 | 15 | 15 | 15 | 15 | 15 | 15 | 15 | 15 |
| Monomer (d) | iso | 2 | 2 | 2 | 2 | 2 | 2 | 2 | 2 |
| Surfactant (c1) | SFY465 | 10 | — | 10 | — | — | — | — | — |
| Surfactant (c2) | SFY485 | — | 10 | — | — | — | — | — | — |
| Solvent | Acetone | 150 | 150 | 110 | 138 | 100 | 118 | 118 | 80 |
|  | DPG | — | — | — | — | — | 20 | — | 20 |
|  | TPG | — | — | — | — | — | — | 20 | — |
| Polymerization initiator | ACP | 0.8 | 0.8 | 0.8 | 0.8 | 0.8 | 0.8 | 0.8 | 0.8 |
| Chain transfer agent | 3MP | 0.6 | 0.6 | 0.6 | 0.6 | 0.6 | 0.6 | 0.6 | 0.6 |

TABLE 2

| Starting material | Abbreviated name | Comp. Ex. 6 | Comp. Ex. 7 | Comp. Ex. 8 | Comp. Ex. 9 | Comp. Ex. 10 | Comp. Ex. 11 | Comp. Ex. 12 | Comp. Ex. 13 | Comp. Ex. 14 | Comp. Ex. 15 |
|---|---|---|---|---|---|---|---|---|---|---|---|
| Monomer (a) | C6FMA | 54 | 54 | 54 | 54 | 54 | 54 | 54 | 54 | 54 | 54 |
| Monomer (b1) | MEO400 | 26 | 26 | 26 | 26 | 26 | 26 | 26 | 26 | 26 | 26 |
| Monomer (b2) | DM | 3 | 3 | 3 | 3 | 3 | 3 | 3 | 3 | 3 | 3 |
| Monomer (b3) | MEOTO800 | 15 | 15 | 15 | 15 | 15 | 15 | 15 | 15 | 15 | 15 |
| Monomer (d) | iso | 2 | 2 | 2 | 2 | 2 | 2 | 2 | 2 | 2 | 2 |
| Additives | SFY104 | 10 | — | — | — | — | — | — | — | — | — |
|  | SFY420 | — | 10 | — | — | — | — | — | — | — | — |
|  | SFY440 | — | — | 10 | — | — | — | — | — | — | — |
|  | PEG400 | — | — | — | 10 | — | — | — | — | — | — |
|  | M400 | — | — | — | — | 10 | — | — | — | — | — |
|  | E420 | — | — | — | — | — | 10 | — | — | — | — |
|  | TDA9 | — | — | — | — | — | — | 10 | — | — | — |
|  | P204 | — | — | — | — | — | — | — | 10 | — | — |
|  | AQ18 | — | — | — | — | — | — | — | — | 10 | — |
|  | DM10 | — | — | — | — | — | — | — | — | — | 10 |
| Solvent | Acetone | 150 | 150 | 150 | 150 | 150 | 150 | 150 | 150 | 150 | 150 |
| Polymerization initiator | ACP | 0.8 | 0.8 | 0.8 | 0.8 | 0.8 | 0.8 | 0.8 | 0.8 | 0.8 | 0.8 |
| Chain transfer agent | 3MP | 0.6 | 0.6 | 0.6 | 0.6 | 0.6 | 0.6 | 0.6 | 0.6 | 0.6 | 0.6 |

TABLE 3

| | Solid content (mass %) after polymerization | State of solution after polymerization | Number of bubbles at the time of conversion to aqueous dispersion by volatilization of solvent | Stability of final aqueous dispersion |
|---|---|---|---|---|
| Ex. 1 | 42.3 | Uniformly dispersed | Small | Uniformly dispersed |
| Ex. 2 | 42.5 | Uniformly dispersed | Small | Uniformly dispersed |
| Ex. 3 | 50.4 | Uniformly dispersed | Small | Uniformly dispersed |
| Comp. Ex. 1 | 42.7 | Uniformly dispersed | Slightly large | Precipitates formed |
| Comp. Ex. 2 | 50.2 | Precipitates formed | Large | Precipitates formed |
| Comp. Ex. 3 | 42.6 | Uniformly dispersed | Large | Uniformly dispersed |
| Comp. Ex. 4 | 42.4 | Uniformly dispersed | Large | Uniformly dispersed |
| Comp. Ex. 5 | NA | Gelated | NA | NA |
| Comp. Ex. 6 | 42.1 | Uniformly dispersed | Large | Milky white precipitates formed |
| Comp. Ex. 7 | 42.4 | Uniformly dispersed | Large | Milky white precipitates formed |
| Comp. Ex. 8 | 42.4 | Uniformly dispersed | Large | Milky white precipitates formed |
| Comp. Ex. 9 | 42.3 | Uniformly dispersed | Small | Uniformly dispersed |
| Comp. Ex. 10 | 42.2 | Uniformly dispersed | Large | Faintly turbid |
| Comp. Ex. 11 | 42.4 | Uniformly dispersed | Large | Milky white precipitates formed |
| Comp. Ex. 12 | 42.3 | Uniformly dispersed | Large | Milky white precipitates formed |
| Comp. Ex. 13 | 42.5 | Uniformly dispersed | Small | Uniformly dispersed |
| Comp. Ex. 14 | NA | Gelated | NA | NA |
| Comp. Ex. 15 | NA | Gelated | NA | NA |

As evident from results in Table 3, in Examples 1 to 3 wherein the surfactant (c) was used for the solution polymerization, the state of the solution after the polymerization was a uniformly dispersed state, the number of bubbles at the time of conversion to an aqueous dispersion by volatilization of the solvent was small, and the stability of the final aqueous dispersion is excellent. In Example 3, the solid content concentration after the polymerization was increased to 50 mass %, but a stable aqueous dispersion could be obtained.

Among Comparative Examples 1 to 5 wherein no surfactant (c) was used, in Comparative Examples 1 and 2 wherein only acetone was used as the organic solvent, the stability of the final aqueous dispersion was poor, and in Comparative Examples 3 and 4 wherein acetone and DPG or TPG were used in combination, the number of bubbles at the time of conversion to an aqueous dispersion by volatilization of the solvent is large. Further, in Comparative Example 5 wherein acetone and DPG were used in combination as the organic solvent and the polymerization concentration was increased to 50 mass %, gelation occurred after the polymerization.

In Comparative Examples 6, 7 and 8 wherein additives having the same main chain structure as that of the surfactant (c) but having the number of addition of ethylene oxide of 0, 1.3 or 3.5, were used, the number of bubbles at the time of conversion to an aqueous dispersion by volatilization of the solvent is large, and no stability of the final aqueous dispersion was obtained.

In Comparative Example 10 wherein a single-end methoxy body of an ethylene oxide polymer was used as an additive which replaces the surfactant (c), the number of bubbles at the time of conversion to an aqueous dispersion by volatilization of the solvent was large, and the final aqueous dispersion was turbid.

In Comparative Examples 11 and 12 wherein an additive which is an ethylene oxide addition type surfactant but does not have the same main chain structure as that of the surfactant (c) of the present invention was used, the number of bubbles at the time of conversion to an aqueous dispersion by volatilization of the solvent was large, and no stability of the final aqueous dispersion was obtained. In Comparative Examples 14 and 15 wherein a surfactant which is not an ethylene oxide addition type was used, gelation occurred after the polymerization.

Among Comparative Examples, in Comparative Examples 3, 4, 9 and 13, a uniform dispersion state was obtained in the final aqueous dispersion in the same manner as in Examples. However, the performance was poor as compared with Examples as a result of evaluation of the water/oil repellency and the antifouling performance by the following methods.

The performance was evaluated by the following methods.

Preparation of Test Cloth

Method of Treating Substrate Cloth

The above obtained aqueous dispersion was diluted with water, and further, TP-10 (manufactured by Meisei Chemical Works, Ltd.: tradename: MEIKANATE TP-10) which is a blocked isocyanate crosslinking agent was added as a crosslinking agent to prepare a treating liquid. The solid content of the treated liquid was 1.0 mass %, and the concentration of the crosslinking agent was 1.0 mass %. In 150 g of the treating liquid, a substrate cloth (non-treated cloth) was dipped and then squeezed by a mangle to a wet pickup of from 60 to 90%. Then, it was dried at 110° C. for 90 seconds and further subjected to curing heat treatment at 170° C. for 60 seconds to obtain a test cloth.

As the substrate cloth (non-treated cloth), three types of a tropical cloth (hereinafter referred to as PET) made of non-dyed polyester, (2) a broadcloth (hereinafter referred to as TC) made of non-dyed polyester/cotton blend fabric in a ratio of 65/35, and (3) a broadcloth (hereinafter referred to as C) made of non-dyed cotton 100%, were used.

Method for Evaluation of Water Repellency

Water Repellency Grades (WR)

With respect to the test cloth prepared by the above method, the water repellency was evaluated in accordance with the spray method disclosed in JIS L1092-98 6.2. The water repellency was shown by the grades as identified in Table 4. The higher the water repellency grade, the higher the water repellency. Symbol +(−) for the water repellency grade indicates that the performance in question is slightly better (poor). This water repellency grade will be represented by "WR".

TABLE 4

| Water repellency grade | State |
|---|---|
| 100 | No wetting or attachment of water droplets observed on the surface |
| 90 | Light attachment of water droplets observed on the surface |
| 80 | Separate partial wettings observed on the surface |
| 70 | Half of the surface wetted |
| 50 | Entire surface wetted |
| 0 | Water completely infiltrated |

Method for Evaluation of Oil Repellency

Oil Repellency Grades (OR)

With respect to the test cloth prepared by the above method, the oil repellency was evaluated in accordance with AATCC standards-TM118 method and shown by the oil repellency grades as identified in Table 5. The oil repellency grades are based on the wettability to the cloth, of eight types of hydrocarbon solvents (test liquids) different in the surface tension. The higher the oil repellency grade, the higher the oil repellency. Symbol +(−) for the oil repellency grade indicates that the performance in question is slightly better (poor). This oil repellency grade will be represented by "OR".

TABLE 5

| Oil repellency grade | Test liquid | Surface tension of test liquid dyn/cm(25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | 65 parts of Nujol/35 parts of hexadecane | 29.6 |
| 1 | Nujol | 31.2 |
| 0 | Less than 1 | |

Method for Evaluation of Soil Release Property (SR Property)

The soil release property was evaluated with respect to the test cloth prepared by the above method, in accordance with AATCC standards-TM 130 method. A specific evaluation method is as follows. The test cloth was spread on a blotting paper placed horizontally, and 5 drops (about 0.2 mL) of each of the following two types of soiling liquids were dropped thereon. Glassine paper of 7.6 cm×7.6 cm was put thereon, and a weight of 2.27 kg was placed thereon. 60 Seconds later, the weight and the glassine paper were removed. The test cloth was left to stand at room temperature for 20 minutes, ballast cloth was added on the test cloth to make the total weight to 1.8 kg, and the test cloth was washed with 100 g of AATCC standard detergent with a tub capacity of 64 liter at a tub temperature of 40° C. The soil release property after the washing was evaluated by the following method.

The soil release property was evaluated by visual observation of soiling liquid-releasing degree and shown by the grades as identified in Table 6. The higher the grade, the higher the soil release property. Symbol +(−) for the soiling liquid-releasing degree grade indicates that the performance in question is slightly better (poor).

With respect to the soiling liquid for the above test, evaluation results using a soiling liquid having 0.1 mass % of carbon black added to used engine oil are shown in the column for "DMO". Evaluation results using a commercial corn oil manufactured by Mazola as a soiling liquid are shown in the column for "corn oil". Evaluation results using a commercial mineral oil manufactured by Kaydol as a soiling liquid are shown in the column for "mineral oil".

TABLE 6

| Soiling liquid-releasing degree grade | Evaluation standards |
|---|---|
| 5 | The stain was completely removed. |
| 4 | The stain was not completely removed and slightly remained. |
| 3 | The profile of the stain was vague, but the degree of removal was low. |
| 2 | The profile of the stain was clear. |
| 1 | The stain was not substantially removed. |
| 0 | The stain was not removed at all. |

Durabilty Against Washing

Washing to confirm the durability was carried out in accordance with JIS 1092: 1998 5. 2a) 3) method. Evaluation after the washing was carried out with respect to the test cloth air-dried overnight in a thermo-hygrostat at 25° C. under a humidity of 50 RH %. The evaluation results with respect to the test cloth not washed are shown in the section for "initial", the evaluation results after repeating the same washing method 5 times are shown in the section for "HL5", and the evaluation results after repeating the same washing method 20 times are shown in the section for "HL20".

PERFORMANCE EVALUATION RESULTS

The performance evaluation results in Examples 1, 2 and Comparative Examples 3, 4, 9 and 13 are shown in Table 7.

TABLE 7

| Examples | Treated cloth | Durability against washing | WR | OR | DMO | Corn oil | Mineral oil |
|---|---|---|---|---|---|---|---|
| Ex. 1 | PET | Initial | 70− | 6− | 4.5 | 5 | 5 |
| | | HL5 | 50+ | 4+ | 4.5 | 5 | 5 |
| | | HL20 | 50 | 3+ | 4 | 5 | 5 |
| | TC | Initial | 70 | 4 | 3.5 | 4 | 4 |
| | | HL5 | 70 | 3 | 3.5 | 4 | 3.5 |
| | | HL20 | 50 | 2+ | 3 | 4 | 3.5 |
| | C | Initial | 70− | 4 | 3 | 4.5 | 4.5 |
| | | HL5 | 70− | 4− | 3 | 4.5 | 4.5 |
| | | HL20 | 50 | 3 | 3.5 | 4 | 4 |
| Ex. 2 | PET | Initial | 50+ | 5+ | 4.5 | 5 | 5 |
| | | HL5 | 50+ | 5− | 4.5 | 5 | 5 |
| | | HL20 | 50+ | 3+ | 4 | 5 | 5 |
| | TC | Initial | 70− | 5 | 3.5 | 4 | 4 |
| | | HL5 | 50+ | 4 | 3.5 | 4 | 4 |
| | | HL20 | 50 | 2+ | 3.5 | 4 | 3.5 |
| | C | Initial | 70− | 4 | 3.5 | 5 | 4.5 |
| | | HL5 | 70− | 4 | 3.5 | 4.5 | 4.5 |
| | | HL20 | 50 | 3 | 3 | 4.5 | 4.5 |

TABLE 7-continued

| Examples | Treated cloth | Durability against washing | WR | OR | DMO | Corn oil | Mineral oil |
|---|---|---|---|---|---|---|---|
| Comp. Ex. 3 | PET | Initial | 70− | 5 | 4.5 | 5 | 5 |
|  |  | HL5 | 50+ | 4 | 4 | 5 | 5 |
|  |  | HL20 | 50 | 3 | 4 | 5 | 4.5 |
|  | TC | Initial | 70− | 4 | 3 | 4 | 3.5 |
|  |  | HL5 | 70− | 3 | 3 | 4 | 3.5 |
|  |  | HL20 | 50 | 2 | 3 | 4 | 3.5 |
|  | C | Initial | 70− | 4 | 3 | 4.5 | 4 |
|  |  | HL5 | 70− | 4− | 3 | 4.5 | 4 |
|  |  | HL20 | 50− | 3 | 3 | 4 | 4 |
| Comp. Ex. 4 | PET | Initial | 70− | 5 | 4.5 | 5 | 5 |
|  |  | HL5 | 70− | 4 | 4 | 5 | 5 |
|  |  | HL20 | 50+ | 3 | 4 | 4.5 | 4.5 |
|  | TC | Initial | 50+ | 4 | 3 | 4 | 4 |
|  |  | HL5 | 50+ | 3 | 3 | 4 | 3.5 |
|  |  | HL20 | 50 | 2 | 3 | 4 | 3.5 |
|  | C | Initial | 70− | 4 | 3 | 4.5 | 4 |
|  |  | HL5 | 50+ | 4− | 3 | 4 | 4 |
|  |  | HL20 | 50 | 3 | 3 | 4 | 4 |
| Comp. Ex. 9 | PET | Initial | 50 | 5 | 4.5 | 5 | 5 |
|  |  | HL5 | 50 | 4 | 4 | 5 | 5 |
|  |  | HL20 | 50+ | 2 | 3.5 | 4.5 | 4.5 |
|  | TC | Initial | 70− | 4 | 3 | 4 | 4 |
|  |  | HL5 | 50+ | 3− | 3 | 4 | 3.5 |
|  |  | HL20 | 50 | 2 | 2.5 | 3.5 | 3 |
|  | C | Initial | 70− | 4 | 3 | 4.5 | 4.5 |
|  |  | HL5 | 50 | 4− | 3 | 4.5 | 4 |
|  |  | HL20 | 50 | 2+ | 3 | 3.5 | 3.5 |
| Comp. Ex. 13 | PET | Initial | 50 | 5 | 4.5 | 5 | 5 |
|  |  | HL5 | 50 | 4− | 4 | 5 | 5 |
|  |  | HL20 | 50 | 2 | 3 | 4.5 | 4 |
|  | TC | Initial | 70− | 4 | 3 | 4 | 3.5 |
|  |  | HL5 | 50+ | 3− | 3 | 4 | 3.5 |
|  |  | HL20 | 50+ | 2− | 2.5 | 3.5 | 3 |
|  | C | Initial | 70− | 4 | 3 | 4.5 | 4 |
|  |  | HL5 | 50+ | 4− | 3 | 4 | 4 |
|  |  | HL20 | 50 | 2+ | 3 | 3.5 | 3.5 |

As evident from the results shown in Table 7, in Examples 1 and 2, the water repellency, the oil repellency and the soil release property (SR property) are good, the decrease in the performance by washing is small, and durable oil repellency and durable antifouling property are excellent. Particularly the durable antifouling property after 20 times of washing is remarkably excellent as compared with Comparative Examples. As a cause of improvement in the durability against washing, an improvement in the infiltration of the antifouling composition to the test cloth by use of the surfactant (c) is conceivable.

Whereas in Comparative Examples 3, 4, 9 and 13, the oil repellency and the SR property are at the same level or below as compared with Examples 1 and 2. Particularly in Comparative Examples 9 and 13, the decrease in the oil repellency and the SR property by repeated washing is remarkable.

Examples Wherein Water/Oil Repellent was Used in Combination

Examples 4 to 6 and Comparative Examples 16 to 18

An antifouling composition comprising the aqueous dispersion composition obtained in Example 2 or Comparative Example 3 and a water/oil repellent was prepared and its performance was evaluated.

Example for Preparation of Water/Oil Repellent

As a water/oil repellent, the following polymer (WOR1), the following polymer (VVOR2) and the following polymer (WOR3) which are fluoropolymers not included in the polymer (A) in the present invention were prepared in accordance with the monomer compositions as identified in Table 8. The monomers and the starting materials used shown in Table 8 are as follows.

Monomer:
C6FMA: $C_6F_{13}C_2H_4OCOC(CH_3)\!\!=\!\!CH_2$ (purity: 99.7 mass %).
StA: stearyl acrylate.
VMA: behenyl methacrylate.
VCM: vinyl chloride.
NMAM: N-methylolacrylamide.
DOM: dioctyl malate.
iso: a 3,5-dimethylpyrazole adduct of 2-isocyanateethyl methacrylate Polymerization Initiator:
VA061A: a 10 mass % aqueous solution of acetate of 2,2'-azobis[2-(2-imidazolin-2-yl)propane].
V601: 2,2'-azobis(2-methyl propionate).

Chain Transfer Agent:
DoSH: n-dodecyl mercaptan.
StSH: stearyl mercaptan.

Surfactant:
E430-aq: a 10 mass % aqueous solution of polyethylene oxide oleyl ether (ethylene oxide about 26 adduct).
SFY465-aq: a 10 mass % aqueous solution of an ethylene oxide adduct (EO addition number: 10) of 2,4,7,9-tetramethyl-5-decyne-4,7-diol.
SFY485-aq: a 10 mass % aqueous solution of an ethylene oxide adduct (EO addition number: 30) of 2,4,7,9-tetramethyl-5-decyne-4,7-diol.
P204-aq: a 10 mass % aqueous solution of an ethylene oxide propylene oxide polymer (proportion of EO: 40 mass %).
AQ18-aq: a 10 mass % aqueous solution of monostearyltrimethylammonium chloride.

Organic Solvent:
DPG: dipropylene glycol.

Others:
Water: deionized water.

TABLE 8

| Abbreviated name | | WOR1 | WOR2 | WOR3 |
|---|---|---|---|---|
| Monomer (a) | C6FMA | 71 | 74 | 90 |
| Monomer (f1) | StA |  | 7 |  |
|  | VMA |  |  | 5 |
| Monomer (f2) | VCM | 20 | 15 | 5 |
| Monomer (d) | NMAM | 3 |  |  |
|  | iso |  | 4 |  |
| Monomer (g) | DOM | 6 |  |  |
| Proportion of fluorine atoms (mass %) |  | 40.6 | 42.3 | 51.5 |

Preparation of Polymer (WOR1)

In a glass beaker, 84.1 g (71 parts by mass) of C6FMA, 3.6 g (3 parts by mass) of NMAM, 7.1 g (6 parts by mass) of DOM, 42.6 g of E430-aq, 4.7 g of SFY485-aq, 11.8 g of P204-aq, 125 g of water and 35.5 g of DPG, and 1.2 g of DoSH were put, heated at 60° C. for 30 minutes and mixed by a homomixer (manufactured by NIHONSEIKI KAISHA LTD., BIO MIXER) to obtain a mixed liquid.

The obtained mixed liquid was treated by a high pressure emulsifier (manufactured by APV LANNIE, Minilab) while being kept at 60° C. under 40 MPa to obtain an emulsion. 300 g of the obtained emulsion was put in a stainless steel reactor and cooled to 40° C. or lower. 5.1 g of VA061A was added, the gaseous phase was replaced with nitrogen, 20.3 g (21 parts by mass) of VCM was introduced, and the polymerization reaction was carried out with stirring at 60° C. for 15 hours to obtain a polymer emulsion having a solid content concentration of 35.7%. The proportion of fluorine atoms in the polymer solid (100 mass %) was 40.6 mass %. Further, the molecular weight of the obtained polymer was confirmed by GPC, whereupon the number average molecular weight was 21,000 and the mass average molecular weight was 32,000. Further, by this measurement, absence of peaks derived from the monomers was also confirmed.

Preparation of Polymer (WOR2)

In a glass beaker, 89.3 g (74 parts by mass) of C6FMA, 8.5 g (7 parts by mass) of STA, 4.8 g (4 parts by mass) of iso, 30.2 g of E430-aq, 6.0 g of P204-aq, 6.0 g of AQ18-aq, 144.4 g of water and 36.2 g of DPG, and 1.2 g of DoSH were put, heated at 60° C. for 30 minutes and mixed by a homomixer (manufactured by NIHONSEIKI KAISHA LTD., BIO MIXER) to obtain a mixed liquid.

The obtained mixed liquid was treated by a high pressure emulsifier while being kept at 60+ C. under 40 MPa to obtain an emulsion. 300 g of the obtained emulsion was put in a stainless steel reactor and cooled to 40° C. or lower. 5.2 g of VA061A was added, the gaseous phase was replaced with nitrogen, 18.1 g (15 parts by mass) of VCM was introduced, and the polymerization reaction was carried out with stirring at 60° C. for 15 hours to obtain a polymer emulsion having a solid content concentration of 34.5%. The proportion of fluorine atoms in the polymer solid (100 mass %) was 42.3 mass %. Further, the molecular weight of the obtained polymer was confirmed by GPC, whereupon the number average molecular weight was 16,000 and the mass average molecular weight was 28,000. Further, by this measurement, absence of peaks derived from the monomers was also confirmed.

Preparation of Polymer (WOR3)

In a glass beaker, 98.6 g (90 parts by mass) of C6FMA, 5.5 g (5 parts by mass) of VMA, 32.8 g of SFY465-aq, 141.5 g of water, 11 g of DPG and 0.5 g of StSH were put, heated at 60° C. for 30 minutes and mixed by a homomixer to obtain a mixed liquid.

The obtained mixed liquid was treated by a high pressure emulsifier while being kept at 60° C. under 40 MPa to obtain an emulsion. 250 g of the obtained emulsion was put in a stainless steel, 0.3 g of V601 was added, followed by cooling to 30° C. or below. The gaseous phase was replaced with nitrogen, 5.5 g (5 parts by mass) of VCM was introduced, and the polymerization reaction was carried out with stirring at 65° C. for 15 hours to obtain a polymer emulsion having a solid content concentration of 34.2%. The proportion of fluorine atoms in the polymer solid (100 mass %) was 51.5 mass %. Further, the molecular weight of the obtained polymer was confirmed by GPC, whereupon the number average molecular weight was 29,000 and the mass average molecular weight was 65,000. Further, by this measurement, absence of peaks derived from the monomers was also confirmed.

Example 4

The aqueous dispersion composition obtained in Example 2, the above prepared polymer WOR1 as a water/oil repellent, and the above TP-10 as a crosslinking agent were mixed and diluted with water to obtain a treating liquid. The solid content concentration of the polymer obtained in Example 2 in the treating liquid was adjusted to 1.0 mass %, the solid content concentration of the polymer WOR1 was adjusted to 0.6 mass %, and the concentration of the crosslinking agent was adjusted to 1.0 mass %.

Using the treating liquid, the performance was evaluated in the same treatment method and evaluation method as in the above Example 2.

The results are shown in Table 10.

Examples 5 and 6

A treating liquid was prepared and the performance was evaluated in the same manner as in Example 4 except that the water/oil repellent was changed as identified in Table 9. The results are shown in Table 10.

Comparative Examples 16 to 18

A treating liquid was prepared and the performance was evaluated in the same manner as in each of Examples 4 to 6 except that the aqueous dispersion composition obtained in Comparative Example 3 was used instead of the aqueous dispersion composition obtained in Example 2. The results are shown in Table 10.

TABLE 9

| | | Ex. 4 | Ex. 5 | Ex. 6 | Comp. Ex. 16 | Comp. Ex. 17 | Comp. Ex. 18 |
|---|---|---|---|---|---|---|---|
| Polymer obtained in Ex. 2 | | 1.0 mass % | 1.0 mass % | 1.0 mass % | — | — | — |
| Polymer obtained in Comp. Ex. 3 | | — | — | — | 1.0 mass % | 1.0 mass % | 1.0 mass % |
| Water/oil repellent | WOR1 | 0.6 mass % | — | — | 0.6 mass % | — | — |
| | WOR2 | — | 0.6 mass % | 0.3 mass % | — | 0.6 mass % | 0.3 mass % |
| | WOR3 | — | — | 0.3 mass % | — | — | 0.3 mass % |
| Crosslinking agent | TP10 | 1.0 mass % | 1.0 mass % | 1.0 mass % | 1.0 mass % | 1.0 mass % | 1.0 mass % |

TABLE 10

| Examples | Treated cloth | Durability against washing | WR | OR | DMO | Corn oil | Mineral oil |
|---|---|---|---|---|---|---|---|
| Ex. 4 | PET | Initial | 80+ | 5+ | 3.5 | 4 | 4 |
| | | HL5 | 80 | 5 | 3.5 | 4 | 4 |
| | | HL20 | 80− | 4 | 3 | 4 | 4 |
| | TC | Initial | 80 | 5 | 3 | 4 | 4 |
| | | HL5 | 80− | 4+ | 3 | 3.5 | 3.5 |
| | | HL20 | 70 | 3+ | 3 | 4 | 4 |
| | C | Initial | 80 | 5 | 3 | 4 | 4 |
| | | HL5 | 70+ | 4+ | 3.5 | 4 | 4 |
| | | HL20 | 70− | 4 | 3 | 4 | 4 |
| Comp. Ex. 16 | PET | Initial | 80− | 5 | 3 | 4 | 4 |
| | | HL5 | 70+ | 4+ | 3 | 4 | 4 |
| | | HL20 | 70 | 3+ | 3 | 4 | 4 |
| | TC | Initial | 70+ | 5 | 3 | 4 | 3.5 |
| | | HL5 | 70+ | 3+ | 3 | 3.5 | 3.5 |
| | | HL20 | 70− | 2+ | 3 | 3.5 | 3.5 |
| | C | Initial | 70+ | 5 | 3 | 3.5 | 4 |
| | | HL5 | 70 | 4 | 3 | 4 | 4 |
| | | HL20 | 50+ | 3 | 3 | 4 | 4 |

TABLE 10-continued

| Examples | Treated cloth | Durability against washing | WR | OR | DMO | Corn oil | Mineral oil |
|---|---|---|---|---|---|---|---|
| Ex. 5 | PET | Initial | 80 | 5+ | 3 | 4 | 4 |
|  |  | HL5 | 80− | 5 | 3 | 4 | 4 |
|  |  | HL20 | 70+ | 4 | 3 | 4 | 3.5 |
|  | TC | Initial | 80− | 5 | 3 | 3 | 3 |
|  |  | HL5 | 70+ | 4 | 3 | 3 | 3 |
|  |  | HL20 | 70− | 3+ | 2.5 | 3.5 | 3 |
|  | C | Initial | 80− | 5 | 2.5 | 3.5 | 3.5 |
|  |  | HL5 | 70+ | 5− | 2.5 | 4 | 3.5 |
|  |  | HL20 | 70 | 4 | 3 | 3.5 | 4 |
| Comp. Ex. 17 | PET | Initial | 70+ | 5 | 3 | 3.5 | 3 |
|  |  | HL5 | 70 | 4 | 2 | 3.5 | 3 |
|  |  | HL20 | 50+ | 3+ | 2 | 4 | 3.5 |
|  | TC | Initial | 70 | 5 | 2.5 | 3 | 3 |
|  |  | HL5 | 50+ | 3 | 2 | 3 | 3 |
|  |  | HL20 | 50− | 2+ | 2 | 3 | 2.5 |
|  | C | Initial | 70 | 5 | 2 | 3 | 3 |
|  |  | HL5 | 70− | 3+ | 2 | 3.5 | 3 |
|  |  | HL20 | 50 | 3− | 2 | 3.5 | 3 |
| Ex. 6 | PET | Initial | 80+ | 5+ | 3.5 | 4 | 4 |
|  |  | HL5 | 80 | 5 | 3 | 4 | 4 |
|  |  | HL20 | 80− | 4 | 3 | 4 | 4 |
|  | TC | Initial | 80 | 5 | 3 | 3.5 | 3.5 |
|  |  | HL5 | 70+ | 4+ | 3 | 3.5 | 3.5 |
|  |  | HL20 | 70 | 3 | 3 | 4 | 4 |
|  | C | Initial | 80 | 5 | 3 | 4 | 4 |
|  |  | HL5 | 70+ | 4+ | 3 | 4 | 4 |
|  |  | HL20 | 70 | 4 | 3 | 4 | 4 |
| Comp. Ex. 18 | PET | Initial | 80 | 5 | 3 | 4 | 4 |
|  |  | HL5 | 70+ | 4+ | 3 | 4 | 4 |
|  |  | HL20 | 70+ | 3+ | 2.5 | 4 | 3.5 |
|  | TC | Initial | 70+ | 5 | 2.5 | 3.5 | 3 |
|  |  | HL5 | 70 | 3 | 3 | 3.5 | 3.5 |
|  |  | HL20 | 50+ | 2 | 3 | 3.5 | 3 |
|  | C | Initial | 70+ | 5 | 3 | 3.5 | 3.5 |
|  |  | HL5 | 70 | 4 | 3 | 4 | 4 |
|  |  | HL20 | 50+ | 3− | 2.5 | 4 | 3.5 |

As evident from the results shown in Table 10, in Example 4 wherein the aqueous dispersion (Example 2) obtained by using the surfactant (c) was used, the durable water repellency, the durable oil repellency and the durable antifouling property were excellent as compared with Comparative Example 16 wherein the aqueous dispersion (Comparative Example 3) obtained without using the surfactant (c) was used. Likewise, in Example 5, the performance was excellent as compared with Comparative Example 17, and in Example 6, the performance was excellent as compared with Comparative Example 18.

Accordingly, it is found that by using the surfactant (c) in preparation of an aqueous dispersion as an antifouling composition, the performance is improved also in a case where the aqueous dispersion and the water/oil repellent are used as mixed.

INDUSTRIAL APPLICABILITY

The antifouling composition of the present invention is useful as treating agents for oil/water repellent treatment or antifouling treatment of clothing.

The entire disclosure of Japanese Patent Application No. 2008-139770 filed on May 28, 2008 including specification, claims and summary is incorporated herein by reference in its entirety.

What is claimed is:

1. An antifouling composition comprising:
100 parts by mass of a fluorocopolymer (A) comprising from 30 to 59 mass % of polymerized units of a monomer (a) and from 40 to 70 mass % of polymerized units of a monomer (b), and from 10 to 30 parts by mass of a surfactant (c), wherein the surfactant (c) comprises at least one compound represented by formula (I):

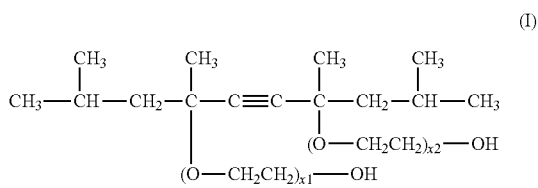

wherein each of x1 and x2 is an integer of at least 1, and (x1+x2) is at least 2 and at most 30, and the average of (x1+x2) per one molecule in the surfactant (c) is at least 6;
wherein the monomer (a) is a monomer having a polyfluoroalkyl group in which the number of carbon atoms to which fluorine atoms are bonded is from 4 to 6 provided that the polyfluoroalkyl group may comprise an etheric oxygen atom; and
wherein the monomer (b) comprises a monomer (b3) represented by formula (4):

$$CH_2=CR^6\text{-}G^2\text{-}(C_2H_4O)_{q2}\text{-}(C_4H_8O)_{q3}\text{-}R^7 \quad (4)$$

wherein each of $R^6$ and $R^7$ which are independent of each other, is a hydrogen atom or a methyl group, q2 is an integer of 0 or from 1 to 50, q3 is an integer of from 1 to 50, $G^2$ is —COO(CH$_2$)$_{r2}$— or —COO(CH$_2$)$_{r2}$—NHCOO—, wherein r2 is an integer of from 0 to 4, and t2 is an integer of from 1 to 4.

2. The antifouling composition according to claim 1, wherein the monomer (b) further comprises a monomer (b1) represented by formula (1):

$$CH_2=CR^1\text{-}G^1\text{-}(C_2H_4O)_{q1}\text{-}R^2 \quad (1)$$

wherein $R^1$ is a hydrogen atom or a methyl group, $R^2$ is a hydrogen atom, a methyl group, an acryloyl group or a methacryloyl group, q1 is an integer of from 1 to 50, and $G^1$ is —COO(CH$_2$)$_{r1}$— or —COO(CH$_2$)$_{r1}$NHCOO— wherein r1 is an integer of from 0 to 4, and t1 is an integer of from 1 to 4.

3. The antifouling composition according to claim 1, wherein the monomer (b) further comprises a monomer (b2) represented by formula (2) or (3):

$$CH_2=CR^3\text{-M-Q-}NR^4R^5 \quad (2)$$

$$CH_2=CR^3\text{-M-Q-N(O)}R^4R^5 \quad (3)$$

wherein $R^3$; is a hydrogen atom or a methyl group, M is —COO— or —CONH—, Q is a $C_{2-4}$ alkylene group or a $C_{2-3}$ alkylene group having some of or all the hydrogen atoms substituted by hydroxy groups, and each of $R^4$ and $R^5$ which are independent of each other, is a benzyl group, a $C_{1-8}$ alkyl group or a $C_{2-3}$ alkyl group having some of hydrogen atoms substituted by hydroxy groups, provided that $R^4$, $R^5$ and the nitrogen atom may form a piperidino group or a pyrrolidinyl group, and $R^4$, $R^5$, the oxygen atom and the nitrogen atom may form a morpholino group.

4. The antifouling composition according to claim 1, wherein the fluorocopolymer (A) further comprises polymerized units of a monomer (d), wherein monomer (d) is a monomer other than the monomer (b), and wherein monomer (d) is a monomer having no polyfluoroalkyl group, and having at least one functional group selected from the group consisting of an isocyanate group, a blocked isocyanate group, an alkoxysilyl group, an epoxy group, a N-methylol group and a N-alkoxymethyl group.

5. An article treated with the antifouling composition as defined in claim 1.

6. A process for producing an antifouling composition, which comprises:
subjecting monomer components (Z) comprising from 30 to 59 mass % of a monomer (a) and from 40 to 70 mass % of a monomer (b) to solution polymerization in an organic solvent containing a volatile organic solvent having a boiling point of at most 100° C. in the presence of a surfactant (c) to form a fluorocopolymer (A), and volatilizing the volatile organic solvent after the solution polymerization and adding an aqueous medium to form an aqueous dispersion,
wherein the surfactant (c) comprises at least one compound represented by formula (I):

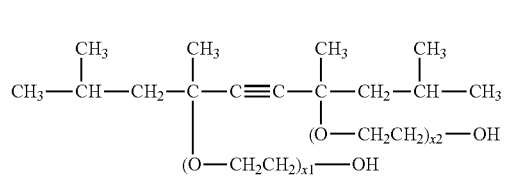

(I)

wherein each of x1 and x2 is an integer of at least 1, and (x1+x2) is at least 2 and at most 30; and the average of (x1+x2) per one molecule in the surfactant (c) is at least 6:
wherein the monomer (a) is a monomer having a polyfluoroalkyl group in which the number of carbon atoms to which fluorine atoms are bonded is from 4 to 6 provided that the polyfluoroalkyl group may contain an etheric oxygen atom; and
wherein the monomer (b) comprises a monomer (b3) represented by formula (4):

wherein each of $R^6$ and $R^7$ which are independent of each other, is a hydrogen atom or a methyl group, q2 is an integer of 0 or from 1 to 50, q3 is an integer of from 1 to 50, $G^2$ is —COO(CH$_2$)$_{r2}$— or —COO(CH$_2$)$_{r2}$—NHCOO—, wherein r2 is an integer of from 0 to 4, and t2 is an integer of from 1 to 4.

7. The process for producing an antifouling composition according to claim 6, wherein the monomer (b) further comprises a monomer (b1) represented by formula (1):

wherein $R^1$ is a hydrogen atom or a methyl group, $R^2$ is a hydrogen atom, a methyl group, an acryloyl group or a methacryloyl group, q1 is an integer of from 1 to 50, and $G^1$ is —COO(CH$_2$)$_{r1}$— or —COO(CH$_2$)$_{r1}$NHCOO— wherein r1 is an integer of from 0 to 4, and t1 is an integer of from 1 to 4.

8. The process for producing an antifouling composition according to claim 6, wherein the monomer (b) further comprises a monomer (b2) represented by formula (2) or (3):

wherein $R^3$ is a hydrogen atom or a methyl group, M is —COO— or —CONH—, Q is a C$_{2-4}$ alkylene group or a C$_{2-3}$ alkylene group having some of or all the hydrogen atoms substituted by hydroxy groups, and each of $R^4$ and $R^5$ which are independent of each other, is a benzyl group, a C$_{1-8}$ alkyl group or a C$_{2-3}$ alkyl group having some of hydrogen atoms substituted by hydroxy groups, provided that $R^4$, $R^5$ and the nitrogen atom may form a piperidino group or a pyrrolidinyl group, and $R^4$, $R^5$, the oxygen atom and the nitrogen atom may form a morpholino group.

9. The process for producing an antifouling composition according to claim 6, wherein the monomer components (Z) further comprise from 0.5 to 5 mass % of a monomer (d),
wherein the monomer (d) is a monomer other than the monomer (b), and wherein the monomer (d) is a monomer having no polyfluoroalkyl group, and having at least one functional group selected from the group consisting of an isocyanate group, a blocked isocyanate group, an alkoxysilyl group, an epoxy group, a N-methylol group and a N-alkoxymethyl group.

10. The antifouling composition of claim 1, wherein the polymerized units of the monomer (b) account for 40 to 60 mass % of the fluorocopolymer (A).

11. The process for producing an antifouling composition of claim 6, wherein the monomer (b) accounts for 40 to 60 mass % of the monomer components (Z).

12. The antifouling composition according to claim 1, wherein the monomer (b) further comprises a monomer (b1) and a monomer (b2),
wherein the monomer (b1) is represented by formula (1):

wherein $R^1$ is a hydrogen atom or a methyl group, $R^2$ is a hydrogen atom, a methyl group, an acryloyl group or a methacryloyl group, q1 is an integer of from 1 to 50, and $G^1$ is —COO(CH$_2$)$_{r1}$— or —COO(CH$_2$)$_{r1}$NHCOO—, wherein r1 is an integer of from 0 to 4, and t1 is an integer of from 1 to 4, and
wherein the monomer (b2) is represented by formula (2) or (3):

wherein $R^3$; is a hydrogen atom or a methyl group, M is —COO— or —CONH—, Q is a C$_{2-4}$ alkylene group or a C$_{2-3}$ alkylene group having some of or all the hydrogen atoms substituted by hydroxy groups, and each of $R^4$ and $R^5$ which are independent of each other, is a benzyl group, a C$_{1-8}$ alkyl group or a C$_{2-3}$ alkyl group having some of hydrogen atoms substituted by hydroxy groups, provided that $R^4$, $R^5$ and the nitrogen atom may form a piperidino group or a pyrrolidinyl group, and $R^4$, $R^5$, the oxygen atom and the nitrogen atom may form a morpholino group.

13. An antifouling composition comprising:
100 parts by mass of a fluorocopolymer (A) comprising from 30 to 59 mass % of polymerized units of a monomer (a) and from 40 to 70 mass % of polymerized units of a monomer (b), and
from 10 to 30 parts by mass of a surfactant (c), wherein the surfactant (c) comprises at least one compound represented by formula (1):

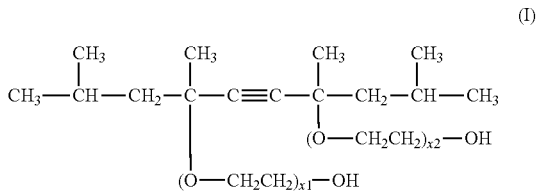

(I)

wherein each of x1 and x2 is an integer of at least 1, and (x1+x2) is at least 2 and at most 30, and the average of (x1+x2) per one molecule in the surfactant (c) is at least 6;

wherein the monomer (a) is a monomer having a polyfluoroalkyl group in which the number of carbon atoms to which fluorine atoms are bonded is from 4 to 6 provided that the polyfluoroalkyl group may comprise an etheric oxygen atom;

wherein the monomer (b) consists of a monomer (b1) and a monomer (b3), wherein the monomer (b1) is represented by formula (1):

$$CH_2=CR^1\text{-}G^1\text{-}(C_2H_4O)_{q1}\text{-}R^2 \quad (1)$$

wherein $R^1$ is a hydrogen atom or a methyl group, $R^2$ is a hydrogen atom, a methyl group, an acryloyl group or a methacryloyl group, q1 is an integer of from 1 to 50, and G1 is —COO(CH$_2$)$_{r1}$— or —COO(CH$_2$)$_{t1}$NHCOO— wherein r1 is an integer of from 0 to 4, and t1 is an integer of from 1 to 4, and wherein the monomer (b3) is represented by formula (4):

$$CH_2=CR^6\text{-}G^2\text{-}(C_2H_4O)_{q2}\text{-}(C_4H_8O)_{q3}\text{-}R^7 \quad (4)$$

wherein each of $R^6$ and $R^7$ which are independent of each other, is a hydrogen atom or a methyl group, q2 is an integer of 0 or from 1 to 50, q3 is an integer of from 1 to 50, $G^2$ is —COO(CH$_2$)$_{r2}$— or —COO(CH$_2$)$_{r2}$—NHCOO—, wherein r2 is an integer of from 0 to 4, and t2 is an integer of from 1 to 4.

14. The antifouling composition according to claim 1, wherein the polymerized units of the monomer (a) account for 30 to 54 mass % of the fluorocopolymer (A).

15. The process for producing an antifouling composition according to claim 6, wherein the monomer (a) accounts for 30 to 54 mass % of the monomer components (Z).

16. The antifouling composition according to claim 13, wherein the polymerized units of the monomer (a) account for 30 to 54 mass % of the fluorocopolymer (A).

* * * * *

UNITED STATES PATENT AND TRADEMARK OFFICE
CERTIFICATE OF CORRECTION

| | | |
|---|---|---|
| PATENT NO. | : 8,507,580 B2 | Page 1 of 1 |
| APPLICATION NO. | : 12/913900 | |
| DATED | : August 13, 2013 | |
| INVENTOR(S) | : Hiroyuki Hara et al. | |

It is certified that error appears in the above-identified patent and that said Letters Patent is hereby corrected as shown below:

On the Title Page, below "(*) Notice" delete

"This patent is subject to a terminal disclaimer.".

On the Title Page, Item (57) ABSTRACT, line 14, "100°C." should read --100°C--.

In the Specifications

Column 3, line 48, "100°C." should read --100°C--.

Column 4, line 60, "$F(CF_2)_6$-," should read --$F(CF_2)_5$-,--.

Column 6, lines 63 and 64, "$C_{2-4}$ alkyl" should read --$C_{1-4}$ alkyl--.

Column 9, line 39, "a-methylstyrene," should read --α-methylstyrene,--.

Column 12, line 37, "polymer (a)" should read --polymer (α)--.

Signed and Sealed this
Twenty-second Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,507,580 B2 | Page 1 of 3 |
| APPLICATION NO. | : 12/913900 | |
| DATED | : August 13, 2013 | |
| INVENTOR(S) | : Hiroyuki Hara et al. | |

It is certified that error appears in the above-identified patent and that said Letters Patent is hereby corrected as shown below:

On the Title Page, below "(*) Notice" delete

"This patent is subject to a terminal disclaimer.".

On the Title Page, Item (57) ABSTRACT, line 14, "100°C." should read --100°C--.

In the Specifications

Column 3, line 48, "100°C." should read --100°C--.

Column 4, line 60, "F(CF$_2$)$_6$-," should read --F(CF$_2$)$_5$-,--.

Column 6, lines 63 and 64, "C$_{2-4}$ alkyl" should read --C$_{1-4}$ alkyl--.

Column 9, line 39, "a-methylstyrene," should read --α-methylstyrene,--.

Column 12, line 37, "polymer (a)" should read --polymer (α)--.

Column 13, line 39, "100°C." should read --100°C--;

line 42, "100°C." should read --100°C--;

lines 46 and 47, "100°C.," should read --100°C,--;

line 49, "100°C." should read --100°C--; and line 55, "100°C." should read --100°C--.

This certificate supersedes the Certificate of Correction issued April 22, 2014.

Signed and Sealed this
Twenty-seventh Day of May, 2014

Michelle K. Lee
*Deputy Director of the United States Patent and Trademark Office*

Column 15, line 12, "100°C.," should read --100°C,--.

Column 16, line 13, "120° C." should read --120°C--.

Column 18, line 62, "CM," should read --DM,--;

line 64, "(150 pads by mass)" should read --(150 parts by mass)--;

line 67, "at 65°" should read --at--.

Column 19, line 1, "C." should read --65°C--;

line 13, "50°C." should read --50°C--;

line 39, "65°C." should read --65°C--; and line 62, "65°C." should read --65°C--.

Column 20, line 20, "65°C." should read --65°C--; and line 66, "were used Further," should read --were used. Further,--.

Column 22, line 3, "65°C." should read --65°C--.

Column 24, line 45, "110°C." should read --110°C--; and line 46, "170°C." should read --170°C--.

Column 26, line 33, "25°C." should read --25°C--.

Column 27, line 66, "(VVOR2)" should read --(WOR2)--.

Column 28, line 62, "60°C." should read --60°C--; and line 67, "60°C." should read --60°C--.

Column 29, line 2, "40°C." should read --40°C--; and

"ofVA061A" should read --of VA061A--;

line 5, "60°C." should read --60°C--;

line 21, "60°C." should read --60°C--;

line 25, "60+C." should read --60°C--;

line 27, "40°C." should read --40°C--;

line 31, "60°C." should read --60°C--;

line 44 and 45, "60°C." should read --60°C--;

CERTIFICATE OF CORRECTION (continued)
U.S. Pat. No. 8,507,580 B2

Column 29 (cont), line 48, "60°C." should read --60°C--;

line 51, "30°C." should read --30°C--; and line 54, "65°C." should read --65°C--.

Column 33, line 9, "100°C." should read --100°C--.

Column 35, line 16, "G1" should read --$G^1$--.